(12) United States Patent
Chan

(10) Patent No.: US 12,316,771 B2
(45) Date of Patent: May 27, 2025

(54) BLOCKCHAIN-IMPLEMENTED CONTROL METHOD AND SYSTEM FOR CONTROLLING AN EXTERNAL PROCESS OR SYSTEM

(71) Applicant: nChain Holdings Limited, St. John's (AG)

(72) Inventor: Ying Chan, London (GB)

(73) Assignee: NCHAIN LICENSING AG, Zug (CH)

( * ) Notice: Subject to any disclaimer, the term of this patent is extended or adjusted under 35 U.S.C. 154(b) by 85 days.

(21) Appl. No.: 17/958,029

(22) Filed: Sep. 30, 2022

(65) Prior Publication Data
US 2023/0144153 A1 May 11, 2023

Related U.S. Application Data

(63) Continuation of application No. 16/315,524, filed as application No. PCT/IB2017/053957 on Jun. 30, 2017, now Pat. No. 11,463,260.

(30) Foreign Application Priority Data

Jul. 5, 2016 (GB) ...................................... 1611698

(51) Int. Cl.
*H04L 9/32* (2006.01)
*G06F 16/23* (2019.01)
(Continued)

(52) U.S. Cl.
CPC ........ *H04L 9/3239* (2013.01); *G06F 16/2379* (2019.01); *G06F 21/602* (2013.01);
(Continued)

(58) Field of Classification Search
CPC ... H04L 9/3239; H04L 9/0861; H04L 9/3066; H04L 9/50; G06F 16/2379; G06F 21/602
See application file for complete search history.

(56) References Cited

U.S. PATENT DOCUMENTS

| 5,511,121 A | 4/1996 | Yacobi |
| 2013/0202104 A1 | 8/2013 | Ghouti et al. |

(Continued)

FOREIGN PATENT DOCUMENTS

| WO | 2015144971 A1 | 10/2015 |
| WO | 2015171580 A1 | 11/2015 |
| WO | 2016161073 A1 | 10/2016 |

OTHER PUBLICATIONS

Ethereum: "White Paper .. ethereum/wiki Wiki .. GitHub", Apr. 13, 2016 (Apr. 13, 2016), pp. 1-21, XP055376148, Retrieved from the Internet <URL:https://github.com/ethereum/wiki/wiki/White-Paper/5f59d858bf36d6f2f6650f1f30f0b8b015741d73> [retrieved on May 26, 2017 (Year: 2016).*

(Continued)

*Primary Examiner* — Ali S Abyaneh
(74) *Attorney, Agent, or Firm* — Tarolli, Sundheim, Covell & Tummino LLP

(57) ABSTRACT

A computer-implemented method for controlling an external process or system and allowing a modification of blockchain transaction outputs, the method comprising one or more steps to generate a blockchain transaction comprising at least one signed input which comprises a value and at least one modifiable output, extract one or more values from one or more signed inputs associated with one or more combination locks, provide one of the values to a portion of logic to obtain a result, and use the result to modify at least one modifiable output of the transaction, wherein the transaction represents the result, wherein the values are extracted external from the blockchain transaction, and wherein the transaction are submitted to the blockchain.

18 Claims, 50 Drawing Sheets

(51) Int. Cl.
  G06F 21/60 (2013.01)
  H04L 9/08 (2006.01)
  H04L 9/30 (2006.01)
  H04L 9/00 (2022.01)

(52) U.S. Cl.
  CPC .......... H04L 9/0861 (2013.01); H04L 9/3066 (2013.01); H04L 9/50 (2022.05)

(56) References Cited

U.S. PATENT DOCUMENTS

| | | | |
|---|---|---|---|
| 2015/0206106 | A1 | 7/2015 | Yago |
| 2015/0213433 | A1* | 7/2015 | Khan ................ G06Q 20/3829 705/71 |
| 2015/0244690 | A1 | 8/2015 | Mossbarger |
| 2015/0288527 | A1 | 10/2015 | Vanstone |
| 2015/0379510 | A1* | 12/2015 | Smith ................ G06F 21/64 705/71 |
| 2016/0085955 | A1* | 3/2016 | Lerner ................ H04L 9/0869 726/20 |
| 2016/0125040 | A1 | 5/2016 | Kheterpal et al. |
| 2017/0091756 | A1* | 3/2017 | Stern ................ G06Q 20/36 |
| 2017/0316390 | A1* | 11/2017 | Smith ................ G06Q 20/407 |
| 2019/0229911 | A1* | 7/2019 | Allen ................ G06Q 20/389 |
| 2019/0356472 | A1* | 11/2019 | Allen ................ H04L 9/0643 |

OTHER PUBLICATIONS

"Create," Oraclize, http://app.oraclize.it/contracts/create, copyright 2016 [retrieved Feb. 27, 2019], 1 page.
"The Oracle Problem," Realitio, https://realit.io/?accept_terms_of_service=current, [retrieved Feb. 27, 2019], 6 pages.
Anonymous, "Background Page," Oraclize, Oct. 2017 [retrieved May 2, 2018], https://web.archive.org/web/20171017121053/http://docs.oraclize.it/, 18 pages.
Anonymous, "What is Ethereum?," EtherScripter, https://web.archive.org/web/20160329151319/http://etherscripter.com/what_is_ethereum.html, archived Mar. 29, 2016 [retrieved Feb. 21, 2019], 4 pages.
Antonopoulos, "Mastering Bitcoin—Unlocking Digital Cryptocurrencies," O'Reilly Media, Inc., Dec. 20, 2014, 282 pages.
Bertani, "Fehu: E-commerce and security, on the same page," Fehu Labs, Apr. 19, 2016, 22 pages.
Bitcoin Wiki, "Talk:Script," retrieved from https://en.bitcoin.it/wiki/Talk:Script, Dec. 19, 2016, 2 pages.
Cassano, "What are Smart Contracts? Cryptocurrency's Killer App," Fast Company, https://www.fastcompany.com/3035723/smart-contracts-could-be-cryptocurrencys-killer-app, Sep. 17, 2014 [retrieved Feb. 27, 2019], 7 pages.
Edgar, "About Reality Keys," Reality Keys, copyright 2013-2016, https://www.realitykeys.com/about, 1 page.
Edgar, "Reality Key Examples," retrieved from https://raw.githubusercontent.com/edmundedgar/realitykeysexamples/master/realitykeysdemo.py, Dec. 19, 2016, 7 pages.
Edgar, "The Reality Keys API," copyright 2013-2016, https://www.realitykeys.com/developers, 8 pages.
Edmunedgar, "[ANN] Reality Keys: An oracle letting you use external state in transactions," Bitcoin Forum, Jan. 20, 2014 [retrieved Feb. 5, 2018], https://bitcointalk.org/index.php?topic=423638.0, 12 pages.
Ethdev, "Multi-Blockchain uses?," retrieved from https://www.reddit.com/r/ethdev/comments/4c6xd4/multiblockchain_uses/, Dec. 19, 2016, 3 pages.
Ethereum, "What is Ethereum?" retrieved from https://web.archive.org/web/20160329151319/http://etherscripter.com/what_is_ethereum.html , Jan. 24, 2017, 6 pages.

Forte et al., "Beyond Bitcoin—Part I: A critical look at blockchain-based systems," IACR Cryptology ePrint Archive 2015:1164, Dec. 1, 2015, 34 pages.
Greenspan, "Beware the impossible smart contract," Linkedin, https://www.linkedin.com/pulse/beware-impossible-smart-contract-gideon-greenspan, Apr. 12, 2016 [retrieved Feb. 27, 2019], 8 pages.
Idelberger et al., "Evaluation of Logic-Based Smart Contracts for Blockchain Systems," 10th International Symposium on Rules and Rule Markup Languages for the Semantic Web, Jul. 6, 2016, 17 pages.
Indian Office Action mailed Nov. 10, 2021, Patent Application No. 201847048589, 6 pages.
International Search Report Application No. PCT/IB2017/053957, mailed Sep. 15, 2017, filed Jun. 30, 2017, 11 pages.
Liang et al., "White Paper," GitHub, https://github.com/ethereum/wiki/wiki/white-paper/5f59d858bf36d6f2f6650f1f30f0b8b015741d73, Apr. 13, 2016 [retrieved Feb. 27, 2019], 37 pages.
Lull3rskat3r et al., "Script to Limit Transactions to Specific Wallets," Bitcoin Stack Exchange, https://bitcoin.stackexchange.com/questions/20526/script-to-limit-transactions-to-specific-wallets, Jan. 14, 2014 [retrieved Feb. 27, 2019], 7 pages.
Markjoingwar et al., "So can you make a complex script and put it into a P2SH address, and it doesn't have to be one of the standard transaction types right? Doesn't this mean Bitcoin can be Turing complete in some cases?," Redditr/bitcoin, https://www.reddit.com/r/Bitcoin/comments/408cof/so_can_you_make_a_complex_script_and_put_it_into/, Jan. 9, 2016 [retrieved Feb. 27, 2019], 5 pages.
Nakamoto, "Bitcoin: A Peer-to-Peer Electronic Cash System," Bitcoin, Oct. 31, 2008, https://bitcoin.org/bitcoin.pdf, 9 pages.
Oraclize, "API Reference," retrieved from http://docs.oraclize.it, Dec. 19, 2016, 9 pages.
Oraclize, "Use Case-Driven Approach," retrieved from https://blog.oraclize.it/use-case-driven-approach-a54b1fcbd2d2#.jxot32mxq, Dec. 7, 2015, 4 pages.
Piasecki et al., "Talk:Script," Bitcoin Wiki, https://en.bitcoin.it/wiki/Talk:Script, Dec. 20, 2011 (most recent edit Nov. 15, 2015) [retrieved Feb. 27, 2019], 2 pages.
Pyongyangpothead, "Multi-Blockchain uses?," Reddit r/ethdev, https://www.reddit.com/r/ethdev/comments/4c6xd4/multiblockchain_uses/, Mar. 27, 2016 [retrieved Feb. 27, 2019], 2 pages.
Realtiy Keys, "API Exchange," retrieved from https://www.realitykeys.com/api/v1/exchange/1?accept_terms_of_service=current, Jan. 10, 2014, 1 page.
Satoshi et al., "Connection Limits," Bitcoin Forum, Aug. 9, 2010, https://bitcointalk.org/index.php?topic=741.0;prev_next=prev, 2 pages.
Tual et al., "IoT Interview Series: Decentralized Smart Devices with Stephan Tual from Slock.it," Postscapes, https://www.postscapes.com/iot-voices/interviews/smart-devices-ethereum-stephan-tual/, [retrieved Feb. 27, 2019], 8 pages.
Ward et al., "Conditional scripting: how does OP_NOTIF (and OP_IF) operation(s) affect the stack?," Bitcoin Stack Exchange, https://bitcoin.stackexchange.com/questions/24160/conditional-scripting-how-does-op-notif-and-op-if-operations-affect-the-sta/24161#24161, Mar. 31, 2014 [retrieved Feb. 27, 2019], 4 pages.
Wikipedia, "Fredkin gate," Wikipedia the Free Encyclopedia, Nov. 26, 2018 [retrieved Feb. 27, 2019], https://en.wikipedia.org/wiki/Fredkin_gate, 3 pages.
UK Commercial Search Report mailed Dec. 16, 2016, Patent Application No. GB1611698.0, 11 pages.
UK IPO Search Report mailed Jan. 24, 2017, Patent Application No. GB1611698.0, 3 pages.
Buterin, "Ethereum White Paper", A Next Generation Smart Contract & Decentralized Application Platform, 2014, 36 pages.

* cited by examiner

Figure 3

Example use case 1: Stock Price Bot's Intermediate Transaction

| Created by Stock Price Bot | |
|---|---|
| STOCK_TX | Transaction-ID |
| Version number | Version number |
| 1 | Number of inputs |
| <Stock Price Bot's previous BTC output - 100,000,000 satoshi>* | Prev Trans Output |
| IDX-00 | Prev Trans Output index |
| Script length | Script length |
| <Sig X><PubKey X> | ScriptSig |
| Sequence number | Sequence number |
| 2 | Number of outputs |
| 546 (dust) | Output value |
| Script length | Output script length |
| OP_DUP OP_HASH160 <PubK-X' Hash> OP_EQUALVERIFY OP_CHECKSIG | Output script |
| 99,999,454 | Output value |
| Script length | Output script length |
| OP_DUP OP_HASH160 <PubK-X Hash> OP_EQUALVERIFY OP_CHECKSIG | Output script |
| LockTime | LockTime |

Figure 4

Use Case Example 1: the Market Index Value Bot's Intermediate Transaction

| Created by Market Index Value Bot | |
|---|---|
| MARKET_INDEX_TX | Transaction-ID |
| Version number | Version number |
| 1 | Number of inputs |
| <Market Index Value Bot's previous BTC output - 100,000,000 satoshi># | Prev Trans Output |
| IDX-00 | Prev Trans Output index |
| Script length | Script length |
| <Sig Y><PubKey Y> | ScriptSig |
| Sequence number | Sequence number |
| 2 | Number of outputs |
| 546 (dust) | Output value |
| Script length | Output script length |
| OP_DUP OP_HASH160 <PubK-Y' Hash> OP_EQUALVERIFY OP_CHECKSIG | Output script |
| 99,999,454 | Output value |
| Script length | Output script length |
| OP_DUP OP_HASH160 <PubK-Y Hash> OP_EQUALVERIFY OP_CHECKSIG | Output script |
| LockTime | LockTime |

Figure 5a

Use Case Example 1: Stock Price Bot's Input

| STOCK_TX | Prev Trans Output |
|---|---|
| IDX-00 | Prev Trans Output index |
| Script length | Script length |
| <not signed><PubKey X'> | ScriptSig |
| Sequence number | Sequence number |

Figure 5b

Use Case Example 1: Market Index Value Bot's Input

| MARKET_INDEX_TX | Prev Trans Output |
|---|---|
| IDX-00 | Prev Trans Output index |
| Script length | Script length |
| <not signed><PubKey Y'> | ScriptSig |
| Sequence number | Sequence number |

Figure 6

Example use case 1: the Trading Bot creates the transaction representing an XOR gate including the transaction inputs received from Stock Price Bot and Market Index Value Bot

| Created by Trading Bot | |
|---|---|
| XOR_TX | Transaction-ID |
| Version number | Version number |
| 3 | Number of inputs |
| <Trading Bot's previous BTC output - 500,000,000 satoshi>* | Prev Trans Output |
| IDX-00 | Prev Trans Output index |
| Script length | Script length |
| <not signed><PubKey A> | ScriptSig |
| Sequence number | Sequence number |
| STOCK_TX | Prev Trans Output |
| IDX-00 | Prev Trans Output index |
| Script length | Script length |
| <not signed><PubKey X'> | ScriptSig |
| Sequence number | Sequence number |
| MARKET_INDEX_TX | Prev Trans Output |
| IDX-00 | Prev Trans Output index |
| Script length | Script length |
| <not signed><PubKey Y'> | ScriptSig |
| Sequence number | Sequence number |
| | Number of outputs |
| | Output value |
| | Output script length |
| | Output script |
| LockTime | LockTime |

Figure 7

Use case example 1: Trading Bot informs Stock Price Bot and Market Index Value Bot of the transaction's storage/access details and requests them to sign their input

| Created by Trading Bot | |
|---|---|
| XOR_TX | Transaction-ID |
| Version number | Version number |
| 3 | Number of inputs |
| <Trading Bot's previous BTC output - 500,000,000 satoshi>* | Prev Trans Output |
| IDX-00 | Prev Trans Output index |
| Script length | Script length |
| <not signed><PubKey A> | ScriptSig |
| Sequence number | Sequence number |
| STOCK_TX | Prev Trans Output |
| IDX-00 | Prev Trans Output index |
| Script length | Script length |
| <Sig X' – SIGHASH_NONE><PubKey X'> | ScriptSig |
| Sequence number | Sequence number |
| MARKET_INDEX_TX | Prev Trans Output |
| IDX-00 | Prev Trans Output index |
| Script length | Script length |
| < Sig Y' – SIGHASH_NONE ><PubKey Y'> | ScriptSig |
| Sequence number | Sequence number |
| | Number of outputs |
| | Output value |
| | Output script length |
| | Output script |
| LockTime | LockTime |

Figure 8

Use case example 1: Trading Bot updates the output to send 5BTC to E_PUT, signs its output with SIGHASH_ALL, and submits to the blockchain

| Created by Trading Bot | |
|---|---|
| XOR_TX | Transaction-ID |
| Version number | Version number |
| 3 | Number of inputs |
| <Trading Bot's previous BTC output - 500,000,000 satoshi>* | Prev Trans Output |
| IDX-00 | Prev Trans Output index |
| Script length | Script length |
| <Sig A – SIGHASH_ALL ><PubKey A> | ScriptSig |
| Sequence number | Sequence number |
| STOCK_TX | Prev Trans Output |
| IDX-00 | Prev Trans Output index |
| Script length | Script length |
| <Sig X' – SIGHASH_NONE><PubKey X'> | ScriptSig |
| Sequence number | Sequence number |
| MARKET_INDEX_TX | Prev Trans Output |
| IDX-00 | Prev Trans Output index |
| Script length | Script length |
| < Sig Y' – SIGHASH_NONE ><PubKey Y'> | ScriptSig |
| Sequence number | Sequence number |
| 1 | Number of outputs |
| 500,001,092 | Output value |
| Script length | Output script length |
| OP_DUP OP_HASH160 <PubK-E_PUT Hash> OP_EQUALVERIFY OP_CHECKSIG | Output script |
| LockTime | LockTime |

Figure 9

Use case example 2
Both Combination Locks create and submit to the blockchain a Bitcoin transaction
(Intermediate Transaction) with an output to their respective Value Embedded PubKey Combination Lock A's Intermediate Transaction:

| Created by Combination Lock A | |
|---|---|
| LOCK_A_TX | Transaction-ID |
| Version number | Version number |
| 1 | Number of inputs |
| <Combination Lock A's previous BTC output - 100,000,000 satoshi>* | Prev Trans Output |
| IDX-00 | Prev Trans Output index |
| Script length | Script length |
| <Sig A><PubKey A> | ScriptSig |
| Sequence number | Sequence number |
| 2 | Number of outputs |
| 546 (dust) | Output value |
| Script length | Output script length |
| OP_DUP OP_HASH160 <PubKey A' Hash> OP_EQUALVERIFY OP_CHECKSIG | Output script |
| 99,999,454 | Output value |
| Script length | Output script length |
| OP_DUP OP_HASH160 <PubKey A Hash> OP_EQUALVERIFY OP_CHECKSIG | Output script |
| LockTime | LockTime |

Output 1 – the input spending this output will communicate PubKey A' to the Controller
Output 2 – change back to Combination Lock A's public key A

Figure 10

Use case example 2
Output 1 – the input spending this output will communicate PubKey B' to the Controller
Output 2 – change back to Combination Lock B's public key B Combination Lock B's Intermediate Transaction:

| Created by Combination Lock B | |
|---|---|
| LOCK_B_TX | Transaction-ID |
| Version number | Version number |
| 1 | Number of inputs |
| <Combination Lock B's previous BTC output – 100,000,000 satoshi>* | Prev Trans Output |
| IDX-00 | Prev Trans Output index |
| Script length | Script length |
| <Sig B><PubKey B> | ScriptSig |
| Sequence number | Sequence number |
| 2 | Number of outputs |
| 546 (dust) | Output value |
| Script length | Output script length |
| OP_DUP OP_HASH160 <PubKey B' Hash> OP_EQUALVERIFY OP_CHECKSIG | Output script |
| 99,999,454 | Output value |
| Script length | Output script length |
| OP_DUP OP_HASH160 <PubKey B Hash> OP_EQUALVERIFY OP_CHECKSIG | Output script |
| LockTime | LockTime |

Figure 11

Use case Example 2

Combination Lock A's transaction input:

| LOCK_A_TX | Prev Trans Output |
|---|---|
| IDX-00 | Prev Trans Output index |
| Script length | Script length |
| <not signed><PubKey A'> | ScriptSig |
| Sequence number | Sequence number |

Combination Lock B's transaction input:

| LOCK_B_TX | Prev Trans Output |
|---|---|
| IDX-00 | Prev Trans Output index |
| Script length | Script length |
| <not signed><PubKey B'> | ScriptSig |
| Sequence number | Sequence number |

Figure 12

Use case example 2

Controller uses the Bitcoin transaction inputs from the Combination Locks and creates a Bitcoin transaction representing an AND gate

| Created by Controller | |
|---|---|
| AND_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| LOCK_A_TX | Prev Trans Output |
| IDX-00 | Prev Trans Output index |
| Script length | Script length |
| <not signed><PubKey A'> | ScriptSig |
| Sequence number | Sequence number |
| LOCK_B_TX | Prev Trans Output |
| IDX-00 | Prev Trans Output index |
| Script length | Script length |
| <not signed><PubKey B'> | ScriptSig |
| Sequence number | Sequence number |
| | Number of outputs |
| | Output value |
| | Output script length |
| | Output script |
| LockTime | LockTime |

Figure 13

Use case example 2

Controller requests for Combination Lock A and Combination Lock B to sign their respective input in the AND Gate Transaction using SIGHASH_NONE.

| Created by Controller | |
|---|---|
| AND_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| LOCK_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| LOCK_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| | Number of outputs |
| | Output value |
| | Output script length |
| | Output script |
| LockTime | LockTime |

Figure 14

Use case example 2

Controller updates AND Gate Transaction's output to send signal to V_DOOR and to give change back to itself. It then signs its input with SIGHASH_ALL to lock in all inputs and outputs

| Created by Controller | |
|---|---|
| AND_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <Sig C' – SIGHASH_ALL><PubKey C> | ScriptSig |
| Sequence number | Sequence number |
| LOCK_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| LOCK_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| 1 | Number of outputs |
| 546 (dust) | Output value |
| Script length | Output script length |
| OP_DUP OP_HASH160 <PubKey V_DOOR Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

Figure 15

Use case example 3:

Both Switches create and submit to the blockchain a Bitcoin transaction (Intermediate Transaction) with an output to their respective Value Embedded PubKey Switch A's Intermediate Transaction:

| Created by Switch A | |
|---|---|
| SWITCH_A_TX | Transaction-ID |
| Version number | Version number |
| 1 | Number of inputs |
| <Switch A's previous BTC output - 100,000,000 satoshi>* | Prev Trans Output |
| IDX-00 | Prev Trans Output index |
| Script length | Script length |
| <Sig A><PubKey A> | ScriptSig |
| Sequence number | Sequence number |
| 2 | Number of outputs |
| 546 (dust) | Output value |
| Script length | Output script length |
| OP_DUP OP_HASH160 <PubKey A' Hash> OP_EQUALVERIFY OP_CHECKSIG | Output script |
| 99,999,454 | Output value |
| Script length | Output script length |
| OP_DUP OP_HASH160 <PubKey A Hash> OP_EQUALVERIFY OP_CHECKSIG | Output script |
| LockTime | LockTime |

Figure 16

Use case example 3

Switch B's Intermediate Transaction:

| Created by Switch B | |
|---|---|
| SWITCH_B_TX | Transaction-ID |
| Version number | Version number |
| 1 | Number of inputs |
| <Switch B's previous BTC output - 100,000,000 satoshi>* | Prev Trans Output |
| IDX-00 | Prev Trans Output index |
| Script length | Script length |
| <Sig B><PubKey B> | ScriptSig |
| Sequence number | Sequence number |
| 2 | Number of outputs |
| 546 (dust) | Output value |
| Script length | Output script length |
| OP_DUP OP_HASH160 <PubKey B' Hash> OP_EQUALVERIFY OP_CHECKSIG | Output script |
| 99,999,454 | Output value |
| Script length | Output script length |
| OP_DUP OP_HASH160 <PubKey B Hash> OP_EQUALVERIFY OP_CHECKSIG | Output script |
| LockTime | LockTime |

Figure 17

Use case example 3

Both Switches create an unsigned Bitcoin transaction input which spends output 1 of their respective Intermediate Transaction. They send this input to the Controller Switch A's transaction input:

| SWITCH_A_TX | Prev Trans Output |
|---|---|
| IDX-00 | Prev Trans Output index |
| Script length | Script length |
| <not signed><PubKey A'> | ScriptSig |
| Sequence number | Sequence number |

Switch B's transaction input:

| SWITCH_B_TX | Prev Trans Output |
|---|---|
| IDX-00 | Prev Trans Output index |
| Script length | Script length |
| <not signed><PubKey B'> | ScriptSig |
| Sequence number | Sequence number |

Figure 18

Use case example 3

Controller uses the Bitcoin transaction inputs from the Switches and creates a Bitcoin transaction representing an IMPLY gate (IMPLY Gate Transaction). This transaction includes an input from the Controller itself, so that it alone can modify the outputs.

| Created by Controller | |
|---|---|
| IMPLY_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SWITCH_A_TX | Prev Trans Output |
| IDX-00 | Prev Trans Output index |
| Script length | Script length |
| <not signed><PubKey A'> | ScriptSig |
| Sequence number | Sequence number |
| SWITCH_B_TX | Prev Trans Output |
| IDX-00 | Prev Trans Output index |
| Script length | Script length |
| <not signed><PubKey B'> | ScriptSig |
| Sequence number | Sequence number |
| | Number of outputs |
| | Output value |
| | Output script length |
| | Output script |
| LockTime | LockTime |

Figure 19

Use case example 3

Controller requests for Switch A and Switch B to sign their respective input in the IMPLY Gate Transaction using SIGHASH_NONE. This locks in the inputs, while still allowing the outputs to be modified

| Created by Controller | |
|---|---|
| IMPLY_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SWITCH_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SWITCH_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| | Number of outputs |
| | Output value |
| | Output script length |
| | Output script |
| LockTime | LockTime |

Figure 20

Use case example 3

Controller updates IMPLY Gate Transaction's output to send signal to L_EXTEND and to give change back to itself. It then signs its input with SIGHASH_ALL to lock in all inputs and outputs, and submits to the blockchain

| Created by Controller | |
|---|---|
| IMPLY_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <Sig C' – SIGHASH_ALL><PubKey C> | ScriptSig |
| Sequence number | Sequence number |
| SWITCH_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SWITCH_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| 1 | Number of outputs |
| 546 (dust) | Output value |
| Script length | Output script length |
| OP_DUP OP_HASH160 <PubKey L_EXTEND Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

Figure 21a

Use case example 4:

Both Switches create and submit to the blockchain a Bitcoin transaction (Intermediate Transaction) with an output to their respective Value Embedded PubKey Switch A's Intermediate Transaction:

| Created by Switch A | |
|---|---|
| SWITCH_A_TX | Transaction-ID |
| Version number | Version number |
| 1 | Number of inputs |
| <Switch Lock A's previous BTC output - 100,000,000 satoshi>* | Prev Trans Output |
| IDX-00 | Prev Trans Output index |
| Script length | Script length |
| <Sig A><PubKey A> | ScriptSig |
| Sequence number | Sequence number |
| 2 | Number of outputs |
| 546 (dust) | Output value |
| Script length | Output script length |
| OP_DUP OP_HASH160 <PubKey A' Hash> OP_EQUALVERIFY OP_CHECKSIG | Output script |
| 99,999,454 | Output value |
| Script length | Output script length |
| OP_DUP OP_HASH160 <PubKey A Hash> OP_EQUALVERIFY OP_CHECKSIG | Output script |
| LockTime | LockTime |

Figure 21b

Use case example 4: Switch B's Intermediate Transaction:

| Created by Switch B | |
|---|---|
| SWITCH_B_TX | Transaction-ID |
| Version number | Version number |
| 1 | Number of inputs |
| <Switch B's previous BTC output - 100,000,000 satoshi>* | Prev Trans Output |
| IDX-00 | Prev Trans Output index |
| Script length | Script length |
| <Sig B><PubKey B> | ScriptSig |
| Sequence number | Sequence number |
| 2 | Number of outputs |
| 546 (dust) | Output value |
| Script length | Output script length |
| OP_DUP OP_HASH160 <PubKey B' Hash> OP_EQUALVERIFY OP_CHECKSIG | Output script |
| 99,999,454 | Output value |
| Script length | Output script length |
| OP_DUP OP_HASH160 <PubKey B Hash> OP_EQUALVERIFY OP_CHECKSIG | Output script |
| LockTime | LockTime |

Figure 22

Use case example 4: Both Switches send the Controller an unsigned Bitcoin transaction input which spends output 1 of their respective Intermediate Transaction Switch A's transaction input:

| SWITCH_A_TX | Prev Trans Output |
|---|---|
| IDX-00 | Prev Trans Output index |
| Script length | Script length |
| <not signed><PubKey A'> | ScriptSig |
| Sequence number | Sequence number |

Switch B's transaction input:

| SWITCH_B_TX | Prev Trans Output |
|---|---|
| IDX-00 | Prev Trans Output index |
| Script length | Script length |
| <not signed><PubKey B'> | ScriptSig |
| Sequence number | Sequence number |

Figure 23

Use case example 4:

Controller uses the Bitcoin transaction inputs from the Switches and creates a Bitcoin transaction representing a NAND gate (NAND Gate Transaction).

| Created by Controller | |
|---|---|
| NAND_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SWITCH_A_TX | Prev Trans Output |
| IDX-00 | Prev Trans Output index |
| Script length | Script length |
| <not signed><PubKey A'> | ScriptSig |
| Sequence number | Sequence number |
| SWITCH_B_TX | Prev Trans Output |
| IDX-00 | Prev Trans Output index |
| Script length | Script length |
| <not signed><PubKey B'> | ScriptSig |
| Sequence number | Sequence number |
| | Number of outputs |
| | Output value |
| | Output script length |
| | Output script |
| LockTime | LockTime |

Figure 24

Use case example 4:

Controller requests for Switch A and Switch B to sign their respective input in the NAND Gate Transaction using SIGHASH_NONE

| Created by Controller | |
|---|---|
| NAND_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SWITCH_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SWITCH_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
|  | Number of outputs |
|  | Output value |
|  | Output script length |
|  | Output script |
| LockTime | LockTime |

Figure 25

Use case example 4:

Controller updates NAND Gate Transaction's output to send signal to L_TURNON and to give change back to itself. It then signs its input with SIGHASH_ALL to lock in all inputs and outputs, and submits to the blockchain

| Created by Controller | |
|---|---|
| NAND_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <Sig C' – SIGHASH_ALL><PubKey C'> | ScriptSig |
| Sequence number | Sequence number |
| SWITCH_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SWITCH_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| 1 | Number of outputs |
| 546 (dust) | Output value |
| Script length | Output script length |
| OP_DUP OP_HASH160 <PubKey L_TURNON Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

Figure 26a

Use case example 5:

Both Switches create and submit to the blockchain a Bitcoin transaction (Intermediate Transaction) with an output to their respective Value Embedded PubKey Sensor A's Intermediate Transaction:

| Created by Sensor A | |
|---|---|
| SENSOR_A_TX | Transaction-ID |
| Version number | Version number |
| 1 | Number of inputs |
| <Switch A's previous BTC output - 100,000,000 satoshi>* | Prev Trans Output |
| IDX-00 | Prev Trans Output index |
| Script length | Script length |
| <Sig A><PubKey A> | ScriptSig |
| Sequence number | Sequence number |
| 2 | Number of outputs |
| 546 (dust) | Output value |
| Script length | Output script length |
| OP_DUP OP_HASH160 <PubKey A' Hash> OP_EQUALVERIFY OP_CHECKSIG | Output script |
| 99,999,454 | Output value |
| Script length | Output script length |
| OP_DUP OP_HASH160 <PubKey A Hash> OP_EQUALVERIFY OP_CHECKSIG | Output script |
| LockTime | LockTime |

Output 1 – the input spending this output will communicate PubKey A' to the Controller
Output 2 – change back to Switch A's public key A

Figure 26b

Use case example 5:

Switch B's Intermediate Transaction:

| Created by Switch B | |
|---|---|
| SWITCH_B_TX | Transaction-ID |
| Version number | Version number |
| 1 | Number of inputs |
| <Switch B's previous BTC output - 100,000,000 satoshi>* | Prev Trans Output |
| IDX-00 | Prev Trans Output index |
| Script length | Script length |
| <Sig B><PubKey B> | ScriptSig |
| Sequence number | Sequence number |
| 2 | Number of outputs |
| 546 (dust) | Output value |
| Script length | Output script length |
| OP_DUP OP_HASH160 <PubKey B' Hash> OP_EQUALVERIFY OP_CHECKSIG | Output script |
| 99,999,454 | Output value |
| Script length | Output script length |
| OP_DUP OP_HASH160 <PubKey B Hash> OP_EQUALVERIFY OP_CHECKSIG | Output script |
| LockTime | LockTime |

Output 1 – the input spending this output will communicate PubKey B' to the Controller
Output 2 – change back to Switch B's public key B

Figure 27

Use case example 5

Sensor A and Switch B create an unsigned Bitcoin transaction input which spends output 1 of their respective Intermediate Transaction. They send this input to the Controller Sensor A's transaction input:

| SENSOR_A_TX | Prev Trans Output |
|---|---|
| IDX-00 | Prev Trans Output index |
| Script length | Script length |
| <not signed><PubKey A'> | ScriptSig |
| Sequence number | Sequence number |

Switch B's transaction input:

| SWITCH_B_TX | Prev Trans Output |
|---|---|
| IDX-00 | Prev Trans Output index |
| Script length | Script length |
| <not signed><PubKey B'> | ScriptSig |
| Sequence number | Sequence number |

Figure 28

Use case example 5

Controller uses the Bitcoin transaction inputs from the Sensor and Switch to create a Bitcoin transaction representing a NONIMPLY gate (NONIMPLY Gate Transaction). This transaction includes an input from the Controller itself, so that it alone can modify the outputs.

| Created by Controller | |
|---|---|
| NONIMPLY_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SENSOR_A_TX | Prev Trans Output |
| IDX-00 | Prev Trans Output index |
| Script length | Script length |
| <not signed><PubKey A'> | ScriptSig |
| Sequence number | Sequence number |
| SWITCH_B_TX | Prev Trans Output |
| IDX-00 | Prev Trans Output index |
| Script length | Script length |
| <not signed><PubKey B'> | ScriptSig |
| Sequence number | Sequence number |
| | Number of outputs |
| | Output value |
| | Output script length |
| | Output script |
| LockTime | LockTime |

Figure 29

Use case example 5

Controller requests for Sensor A and Switch B to sign their respective input in the NONIMPLY Gate Transaction using SIGHASH_NONE. This locks in the inputs, while still allowing the outputs to be modified.

| Created by Controller | |
|---|---|
| NONIMPLY_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SENSOR_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SWITCH_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
|  | Number of outputs |
|  | Output value |
|  | Output script length |
|  | Output script |
| LockTime | LockTime |

Figure 30

Use case example 5

Controller updates NONIMPLY Gate Transaction's output to send signal to L_ON and to give change back to itself. It then signs its input with SIGHASH_ALL to lock in all inputs and outputs, and submits to the blockchain.

| Created by Controller | |
|---|---|
| NONIMPLY_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <Sig C' – SIGHASH_ALL><PubKey C> | ScriptSig |
| Sequence number | Sequence number |
| SENSOR_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SWITCH_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| 1 | Number of outputs |
| 546 (dust) | Output value |
| Script length | Output script length |
| OP_DUP OP_HASH160 <PubKey L_ON Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

Figure 31

Use case example 6

Switch creates and submits to the blockchain an Intermediate Transaction with an output to its Value Embedded PubKey.

| Created by Switch | |
|---|---|
| SWITCH_TX | Transaction-ID |
| Version number | Version number |
| 1 | Number of inputs |
| <Switch's previous BTC output - 100,000,000 satoshi>* | Prev Trans Output |
| IDX-00 | Prev Trans Output index |
| Script length | Script length |
| <Sig X><PubKey X> | ScriptSig |
| Sequence number | Sequence number |
| 2 | Number of outputs |
| 546 (dust) | Output value |
| Script length | Output script length |
| OP_DUP OP_HASH160 <PubKey X' Hash> OP_EQUALVERIFY OP_CHECKSIG | Output script |
| 99,999,454 | Output value |
| Script length | Output script length |
| OP_DUP OP_HASH160 <PubKey X Hash> OP_EQUALVERIFY OP_CHECKSIG | Output script |
| LockTime | LockTime |

Figure 32

Use case example 6
Switch sends Controller an unsigned Bitcoin transaction input spending Output 1 of the Intermediate Transaction

| SWITCH_TX | Prev Trans Output |
|---|---|
| IDX-00 | Prev Trans Output index |
| Script length | Script length |
| <not signed><PubKey X'> | ScriptSig |
| Sequence number | Sequence number |

Figure 33

Use case example 6
Controller creates a Bitcoin transaction representing an NOT gate (NOT Gate Transaction) including the Bitcoin transaction input received from Switch.

| Created by Controller | |
|---|---|
| NOT_GATE_TX | Transaction-ID |
| Version number | Version number |
| 2 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SWITCH_TX | Prev Trans Output |
| IDX-00 | Prev Trans Output index |
| Script length | Script length |
| <not signed><PubKey X'> | ScriptSig |
| Sequence number | Sequence number |
| | Number of outputs |
| | Output value |
| | Output script length |
| | Output script |
| LockTime | LockTime |

Figure 34

Use case example 6

Controller requests Switch to sign its input in NOT Gate Transaction so that it is locked in

| Created by Controller | |
|---|---|
| NOT_GATE_TX | Transaction-ID |
| Version number | Version number |
| 2 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SWITCH_TX | Prev Trans Output |
| IDX-00 | Prev Trans Output index |
| Script length | Script length |
| <Sig X' – SIGHASH_NONE><PubKey X'> | ScriptSig |
| Sequence number | Sequence number |
| | Number of outputs |
| | Output value |
| | Output script length |
| | Output script |
| LockTime | LockTime |

Figure 35

Use case example 6

Controller updates NOT Gate Transaction's output to send a signal to A_ACTIVATE and change back to its own public key C. It then signs is input with SIGHASH_ALL, and submits to the blockchain

| Created by Trading Bot | |
|---|---|
| NOT_GATE_TX | Transaction-ID |
| Version number | Version number |
| 2 | Number of inputs |
| <Controller's previous BTC output - 100,000,000 satoshi>* | Prev Trans Output |
| IDX-00 | Prev Trans Output index |
| Script length | Script length |
| <Sig C – SIGHASH_ALL><PubKey C> | ScriptSig |
| Sequence number | Sequence number |
| SWITCH_TX | Prev Trans Output |
| IDX-00 | Prev Trans Output index |
| Script length | Script length |
| <Sig X' – SIGHASH_NONE><PubKey X'> | ScriptSig |
| Sequence number | Sequence number |
| 2 | Number of outputs |
| 546 (dust) | Output value |
| Script length | Output script length |
| OP_DUP OP_HASH160 <PubKey A_ACTIVATE Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

Figure 36a

Use case example 7

Both Temp. Sensors create and submit to the blockchain a Bitcoin transaction (Intermediate Transaction) with an output to their respective Value Embedded PubKey This Figure shows Temp. Sensor A's Intermediate Transaction:
Output 1 – the input spending this output will communicate PubKey A' to the Controller
Output 2 – change back to Temp. Sensor A's public key A

| Created by Temp. Sensor A | |
|---|---|
| TEMP_A_TX | Transaction-ID |
| Version number | Version number |
| 1 | Number of inputs |
| < Temp. Sensor A's previous BTC output – 100,000,000 satoshi>* | Prev Trans Output |
| IDX-00 | Prev Trans Output index |
| Script length | Script length |
| <Sig A><PubKey A> | ScriptSig |
| Sequence number | Sequence number |
| 2 | Number of outputs |
| 546 (dust) | Output value |
| Script length | Output script length |
| OP_DUP OP_HASH160 <PubKey A' Hash> OP_EQUALVERIFY OP_CHECKSIG | Output script |
| 99,999,454 | Output value |
| Script length | Output script length |
| OP_DUP OP_HASH160 <PubKey A Hash> OP_EQUALVERIFY OP_CHECKSIG | Output script |
| LockTime | LockTime |

Figure 36b

Use case example 7

Temp. Sensor B's Intermediate Transaction:

| Created by Temp. Sensor B | |
|---|---|
| TEMP_B_TX | Transaction-ID |
| Version number | Version number |
| 1 | Number of inputs |
| < Temp. Sensor B's previous BTC output - 100,000,000 satoshi >* | Prev Trans Output |
| IDX-00 | Prev Trans Output index |
| Script length | Script length |
| <Sig B><PubKey B> | ScriptSig |
| Sequence number | Sequence number |
| 2 | Number of outputs |
| 546 (dust) | Output value |
| Script length | Output script length |
| OP_DUP OP_HASH160 <PubKey B' Hash> OP_EQUALVERIFY OP_CHECKSIG | Output script |
| 99,999,454 | Output value |
| Script length | Output script length |
| OP_DUP OP_HASH160 <PubKey B Hash> OP_EQUALVERIFY OP_CHECKSIG | Output script |
| LockTime | LockTime |

Figure 37

Use case example 7

Both Temp. Sensor create an unsigned Bitcoin transaction input which spends output 1 of their respective Intermediate Transaction. They send this input to the Controller.

Temp. Sensor A's transaction input:

| TEMP_A_TX | Prev Trans Output |
|---|---|
| IDX-00 | Prev Trans Output index |
| Script length | Script length |
| <not signed><PubKey A'> | ScriptSig |
| Sequence number | Sequence number |

Temp. Sensor B's transaction input:

| TEMP_B_TX | Prev Trans Output |
|---|---|
| IDX-00 | Prev Trans Output index |
| Script length | Script length |
| <not signed><PubKey B'> | ScriptSig |
| Sequence number | Sequence number |

Figure 38

Use case example 7

Controller uses the Bitcoin transaction inputs from the Temperature Sensors and creates a Bitcoin transaction representing an OR gate (OR Gate Transaction). This transaction includes an input from the Controller itself, so that it alone can modify the outputs.

| Created by Controller | |
|---|---|
| OR_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| TEMP_A_TX | Prev Trans Output |
| IDX-00 | Prev Trans Output index |
| Script length | Script length |
| <not signed><PubKey A'> | ScriptSig |
| Sequence number | Sequence number |
| TEMP_B_TX | Prev Trans Output |
| IDX-00 | Prev Trans Output index |
| Script length | Script length |
| <not signed><PubKey B'> | ScriptSig |
| Sequence number | Sequence number |
|  | Number of outputs |
|  | Output value |
|  | Output script length |
|  | Output script |
| LockTime | LockTime |

Figure 39

Use case example 7

Controller requests for Temp. Sensor A and Temp. Sensor B to sign their respective input in the OR Gate Transaction using SIGHASH_NONE. This locks in the inputs, while still allowing the outputs to be modified.

| Created by Controller | |
|---|---|
| OR_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| TEMP_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| TEMP_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
|  | Number of outputs |
|  | Output value |
|  | Output script length |
|  | Output script |
| LockTime | LockTime |

Figure 40

Use case example 7

Controller updates OR Gate Transaction's output to send signal to S_COOL and to give change back to itself. It then signs its input with SIGHASH_ALL to lock in all inputs and outputs, and submits to the blockchain

| Created by Controller | |
|---|---|
| OR_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <Sig C' – SIGHASH_ALL><PubKey C> | ScriptSig |
| Sequence number | Sequence number |
| TEMP_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| TEMP_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| 1 | Number of outputs |
| 546 (dust) | Output value |
| Script length | Output script length |
| OP_DUP OP_HASH160 <PubKey S_COOL Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

Figure 41a

Use case example 8

Both Scanners create and submit to the blockchain a Bitcoin transaction (Intermediate Transaction) with an output to their respective Value Embedded PubKey Scanner A's Intermediate Transaction:
Output 1 – the input spending this output will communicate PubKey A' to the Controller
Output 2 – change back to Scanner A's public key A

| Created by Scanner A | |
|---|---|
| SCANNER_A_TX | Transaction-ID |
| Version number | Version number |
| 1 | Number of inputs |
| < Scanner A's previous BTC output - 100,000,000 satoshi>* | Prev Trans Output |
| IDX-00 | Prev Trans Output index |
| Script length | Script length |
| <Sig A><PubKey A> | ScriptSig |
| Sequence number | Sequence number |
| 2 | Number of outputs |
| 546 (dust) | Output value |
| Script length | Output script length |
| OP_DUP OP_HASH160 <PubKey A' Hash> OP_EQUALVERIFY OP_CHECKSIG | Output script |
| 99,999,454 | Output value |
| Script length | Output script length |
| OP_DUP OP_HASH160 <PubKey A Hash> OP_EQUALVERIFY OP_CHECKSIG | Output script |
| LockTime | LockTime |

Figure 41b

Use case example 8

Both Scanners create and submit to the blockchain a Bitcoin transaction (Intermediate Transaction) with an output to their respective Value Embedded PubKey Scanner B's Intermediate Transaction:

| Created by Scanner B | |
|---|---|
| SCANNER_B_TX | Transaction-ID |
| Version number | Version number |
| 1 | Number of inputs |
| < Scanner B's previous BTC output - 100,000,000 satoshi>* | Prev Trans Output |
| IDX-00 | Prev Trans Output index |
| Script length | Script length |
| <Sig B><PubKey B> | ScriptSig |
| Sequence number | Sequence number |
| 2 | Number of outputs |
| 546 (dust) | Output value |
| Script length | Output script length |
| OP_DUP OP_HASH160 <PubKey B' Hash> OP_EQUALVERIFY OP_CHECKSIG | Output script |
| 99,999,454 | Output value |
| Script length | Output script length |
| OP_DUP OP_HASH160 <PubKey B Hash> OP_EQUALVERIFY OP_CHECKSIG | Output script |
| LockTime | LockTime |

Figure 42

Use case example 8

Both Scanners create an unsigned Bitcoin transaction input which spends output 1 of their respective Intermediate Transaction. They send this input to the Controller.

Scanner A's transaction input:

| SCANNER_A_TX | Prev Trans Output |
|---|---|
| IDX-00 | Prev Trans Output index |
| Script length | Script length |
| <not signed><PubKey A'> | ScriptSig |
| Sequence number | Sequence number |

Scanner B's transaction input:

| SCANNER_B_TX | Prev Trans Output |
|---|---|
| IDX-00 | Prev Trans Output index |
| Script length | Script length |
| <not signed><PubKey B'> | ScriptSig |
| Sequence number | Sequence number |

Figure 43

Use case example 8

Controller uses the Bitcoin transaction inputs from the Scanners and creates a Bitcoin transaction representing a XNOR gate (XNOR Gate Transaction). This transaction includes an input from the Controller itself, so that it alone can modify the outputs.

| Created by Controller | |
|---|---|
| XNOR_GATE_TX | Transaction-ID |
| Version number | Version number |
| 3 | Number of inputs |
| <Controller's previous BTC output - 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SCANNER_A_TX | Prev Trans Output |
| IDX-00 | Prev Trans Output index |
| Script length | Script length |
| <not signed><PubKey A'> | ScriptSig |
| Sequence number | Sequence number |
| SCANNER_B_TX | Prev Trans Output |
| IDX-00 | Prev Trans Output index |
| Script length | Script length |
| <not signed><PubKey B'> | ScriptSig |
| Sequence number | Sequence number |
| | Number of outputs |
| | Output value |
| | Output script length |
| | Output script |
| LockTime | LockTime |

Figure 44

Use case example 8

Controller requests for Scanner A and Scanner B to sign their respective input in the XNOR Gate Transaction using SIGHASH_NONE. This locks in the inputs, while still allowing the outputs to be modified.

| Created by Controller | |
|---|---|
| XNOR_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <not signed><PubKey C> | ScriptSig |
| Sequence number | Sequence number |
| SCANNER_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SCANNER_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
|  | Number of outputs |
|  | Output value |
|  | Output script length |
|  | Output script |
| LockTime | LockTime |

Figure 45

Use case example 8

Controller updates XNOR Gate Transaction's output to send signal to S_ACCEPT and to give change back to itself. It then signs its input with SIGHASH_ALL to lock in all inputs and outputs, and submits to the blockchain.

| Created by Controller | |
|---|---|
| XNOR_GATE_TX | Transaction-ID |
| Version number | Version number |
| 3 | Number of inputs |
| <Controller's previous BTC output – 100,000,000 satoshi>* | Prev Trans Output |
| IDX-00 | Prev Trans Output index |
| Script length | Script length |
| <Sig C' – SIGHASH_ALL><PubKey C> | ScriptSig |
| Sequence number | Sequence number |
| SCANNER_A_TX | Prev Trans Output |
| IDX-00 | Prev Trans Output index |
| Script length | Script length |
| <Sig A' – SIGHASH_NONE><PubKey A'> | ScriptSig |
| Sequence number | Sequence number |
| SCANNER_B_TX | Prev Trans Output |
| IDX-00 | Prev Trans Output index |
| Script length | Script length |
| <Sig B' – SIGHASH_NONE><PubKey B'> | ScriptSig |
| Sequence number | Sequence number |
| 1 | Number of outputs |
| 546 (dust) | Output value |
| Script length | Output script length |
| OP_DUP OP_HASH160 <PubKey S_ACCEPT Hash> OP_EQUALVERIFY OP_CHECKSIG | Output script |
| 99,999,454 | Output value |
| Script length | Output script length |
| OP_DUP OP_HASH160 <PubKey C Hash> OP_EQUALVERIFY OP_CHECKSIG | Output script |
| LockTime | LockTime |

BLOCKCHAIN-IMPLEMENTED CONTROL METHOD AND SYSTEM FOR CONTROLLING AN EXTERNAL PROCESS OR SYSTEM

CROSS REFERENCE TO RELATED APPLICATIONS

This application is a continuation of U.S. patent application Ser. No. 16/315,524, filed Jan. 4, 2019, entitled "BLOCKCHAIN-IMPLEMENTED CONTROL METHOD AND SYSTEM FOR CONTROLLING AN EXTERNAL PROCESS OR SYSTEM," which is a 371 Nationalization Patent Application PCT/IB2017/053957, filed Jun. 30, 2017, entitled "A BLOCKCHAIN-IMPLEMENTED CONTROL METHOD AND SYSTEM FOR CONTROLLING AN EXTERNAL PROCESS OR SYSTEM," which claims priority to United Kingdom Patent Application No. 1611698.0, filed Jul. 5, 2016, the disclosures of with are incorporated herein by reference in their entirety.

FIELD OF INVENTION

This invention relates generally to distributed ledger technology (including blockchain related technologies), and in particular the use of a blockchain in implementing, controlling and/or automating a task or process. It may relate to the use of a blockchain or related technology for recording or representing the execution of a portion of logic. This portion of logic may be arranged to implement the functionality of a logic gate, or plurality of logic gates, such as AND, XOR, NOT, OR etc.

BACKGROUND OF INVENTION

It is important to note that in this document we use the term 'blockchain' for the sake of convenience and ease of reference because it is currently the most widely known term in this context. However, the term is used herein (including in the claims) to include all forms of electronic, computer-based distributed ledgers, including, but not limited to blockchain and transaction-chain technologies, permissioned and un-permissioned ledgers, shared ledgers and variations thereof.

A blockchain is an electronic ledger which is implemented as a computer-based decentralised, distributed system made up of blocks which in turn are made up of transactions. Each transaction includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems. It would be highly advantageous if the blockchain could be used for tasks and processes, such as automated control processes, which are not limited to the realm of cryptocurrency. Such solutions would be able to harness the benefits of the blockchain (e.g., a permanent, tamper proof record of events, distributed processing etc) while being more versatile in their applications.

Such an improved solution has now been devised. Thus, in accordance with the present invention there is provided a system and method as defined in the appended claims.

SUMMARY OF INVENTION

Therefore, in accordance with the invention there may be provided a computer-implemented method of executing a portion of logic. Additionally, or alternatively, the invention may be described as a control method. It may control the operation of a hardware and/or software resource. It may control the execution of a computer-implemented process. Additionally, or alternatively, the method may provide a technical mechanism for using a blockchain to record or represent the execution, or the result of the execution, of a portion of logic.

The method may comprise the steps:
generating a blockchain Transaction which comprises:
  at least one signed input which comprises a value; and
  at least one modifiable output;
extracting the value from the signed input and providing it to a portion of logic to obtain a result; and
using the result to modify the output of the Transaction.

The result may be used to modify the output such that the Transaction represents the result. The transaction may provide a record of the execution of the portion of logic. This record may be stored on a blockchain. It may provide a record of the result of the execution. It may provide a record which comprises parameters relating to the execution.

The term 'blockchain' is intended to include all forms of electronic, computer-based distributed ledgers including blockchain and transaction-chain technologies, alt-chains, permissioned and un-permissioned ledgers, shared ledgers, and variations thereof.

The portion of logic may be a computer-implemented process. It may be arranged to perform a specified task.

The portion of logic may be external to one or both of the Transaction and the blockchain. Furthermore, a Controller (i.e., the owner of the Transaction and the only entity which can update the transaction's outputs after the inputs are signed) may also be external to one or both of the Transaction and the blockchain. The external Controller can apply the portion of logic to the extracted value to obtain the result and communicate with the Transaction to modify the output of the Transaction based on the result. The portion of logic can be representative of a system which is external to one or both of the Transaction and the blockchain and the method further comprises modifying a state of the system based on the modified output of the Transaction. In this way, the invention can be envisaged to utilize the inherent security of the blockchain system to implement, or at least record the state of, external ("off-block") logic systems thereby extending the functionality and security of the blockchain system to external systems.

The external system can be any system external to the blockchain whose functionality can, for example, be reduced to a mathematical function, algorithm, or portion of logic such as the functionality of a logic gate or a plurality of logic gates. Such systems will generally have one or more inputs and perform one or more operations on the inputs to generate one or more outputs.

Embodiments of the present invention are useful to ensure that a Controller of such a system remains in control of the system and that the system is robust to attack (e.g., hacking) from another entity. From the perspective of the blockchain, a technical problem solved by at least certain embodiments of the present invention is how to utilize the inherent security of a blockchain system for controlling external "off-block" systems. From the perspective of an external system, a technical problem solved by at least certain embodiments of the present invention is how to increase the security of the external system so that it is robust to hack attacks from third parties.

Examples of external systems to which the present invention can be applied are described herein and include: trading platforms; electronic locks; vehicle control systems; sensors; lighting systems; heating/cooling systems; alarm systems; and industrial manufacturing systems. However, these represent a non-exhaustive list and it is important to note that embodiments of the present invention can in principle be applied to introduce the functionality of a blockchain system into any external system which can be represented by one or more inputs, one or more operations on the inputs; and one or more outputs.

The portion of logic may be arranged to implement the functionality of a logic gate or plurality of logic gates. The logic gate may be an AND, NOT, OR, NOR, XOR, IMPLY, NAND, NONIMPLY or XNOR gate.

The method may further comprise the step of submitting the Transaction to a blockchain. The signed input may be provided to the Transaction using an unlocking script.

The at least one input may be signed using a signature hash type which renders the input as non-modifiable. The signature hash type may be SIGHASH NONE.

The Transaction may further comprise at least one unsigned input.

The method may further comprise the step of submitting the Transaction to a blockchain. It may comprise the step of signing the unsigned input after the output has been modified. The unsigned input may be signed using a signature hash type which prevents modification of the whole Transaction. The signature hash type may be SIGHASH ALL.

The value may be embedded in a public key associated with the signed input. Additionally, or alternatively, it may be extracted from the public key so as to provide it to the portion of logic.

The method may further comprise the step of establishing and/or selecting a protocol and using the protocol to embed the value in the public key. The public key may be used to create a locking script in an intermediate blockchain Transaction.

The method may further comprise the step of submitting the intermediate Transaction to a blockchain.

The value may be embedded in the public key by generating a new public key P' wherein:

$$P' = P + \text{HASH}(\text{value} \oplus S) \times G$$

where:
P is a base or initial public key
G is an Elliptic Curve function, such as secp256k1
x denotes elliptic curve multiplication by scalar; and
$\oplus$ denotes elliptic curve addition.

The method may further comprise the step of generating a new private key corresponding to the new public key, wherein:

$$\text{new private key } V' = V + \text{HASH}(\text{value} + S)$$

The value which is embedded in the public key may be selected from a specified range of values.

The invention also provides a corresponding system. The system may be arranged to implement any embodiment of the method described above.

The invention may provide a computer-implemented system comprising:
 at least one computer-based resource arranged to perform the step(s) of any preceding claim; and
 a blockchain or other type of electronic ledger. This may be a distributed ledger.

Any feature described in relation to one aspect or embodiment of the invention may also be used to effect with one or more other aspects/embodiments.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIGS. 3 to 8 show blockchain transactions used in accordance with use case example 1 provided below.

FIGS. 9 to 14 show blockchain transactions used in accordance with use case example 2 provided below.

FIGS. 15 to 20 show blockchain transactions used in accordance with use case example 3 provided below.

FIGS. 21a to 25 show blockchain transactions used in accordance with use case example 4 provided below.

FIGS. 26a to 30 show blockchain transactions used in accordance with use case example 5 provided below.

FIGS. 31 to 35 show blockchain transactions used in accordance with use case example 6 provided below.

FIGS. 36a to 40 show blockchain transactions used in accordance with use case example 7 provided below.

FIGS. 41a to 45 show blockchain transactions used in accordance with use case example 7 provided below.

DETAILED DESCRIPTION

Figure 1:
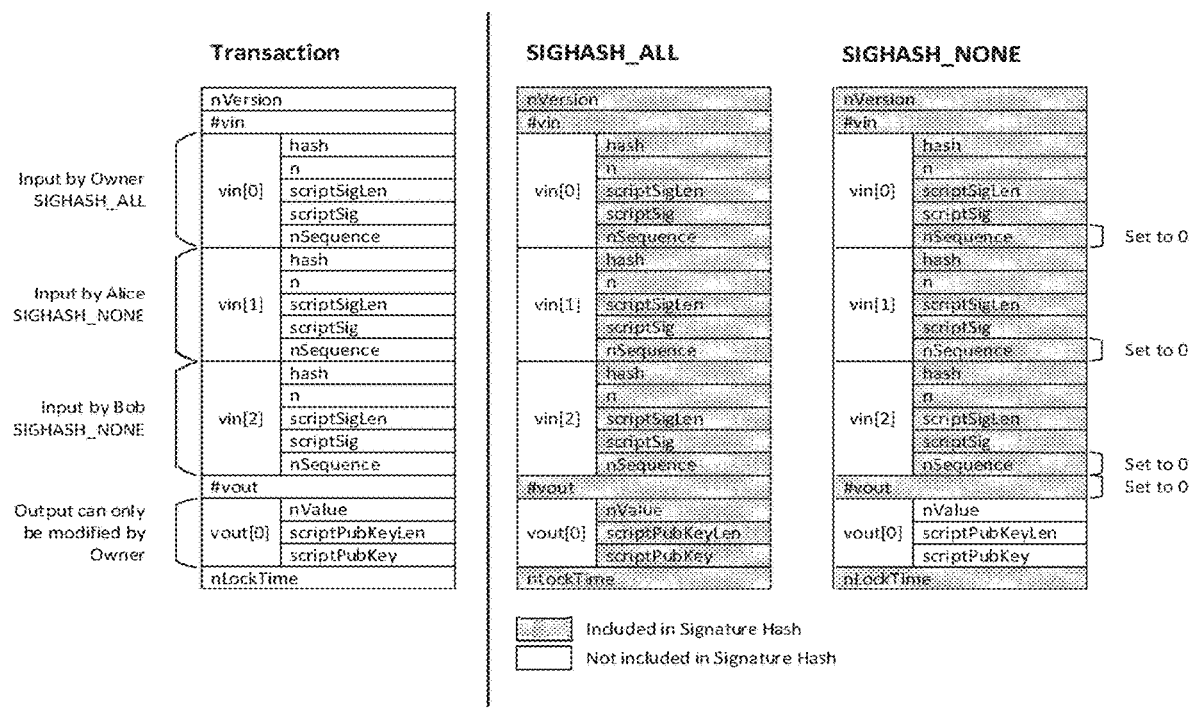
FIG. 1 shows an example transaction and the parts which are hashed with SIGHASH ALL and SIGHASH NONE

We now provide an illustrative embodiment of the invention. This embodiment includes techniques relating to:

- The establishment of a shared secret and its use in the generation of new cryptographic keys
- A mechanism for securely embedding values in Elliptic Curve public keys;
- A blockchain-related scheme or solution in which outputs are conditional upon inputs using a specific signature hash combination; and
- The combination of these techniques to provide a novel mechanism for constructing an externally evaluated function (i.e. external to the blockchain).

The invention provides a novel and advantageous solution for using a blockchain to implement a function. The blockchain is used to provide a record of the execution of the function and/or a result of its result. A function can be a subroutine or procedure (i.e. a process or portion of logic) which is applied to a set of inputs and returns a set of outputs. In a preferred embodiment, the function is executed 'off-block' ie its performance is not blockchain-dependent. The function is performed by a computer-based resource.

A blockchain (e.g. Bitcoin) transaction is a transfer of (e.g. Bitcoin) value which typically references previous transaction outputs as new transaction inputs and dedicates all input values to new outputs. Transactions are not encrypted, so it is possible to browse and view every transaction ever collected into a block. It would be highly advantageous, however, to be able to construct a blockchain transaction which acts as a function, where the transaction output(s) are conditional or dependent on the information embedded in the transaction input(s).

Important aspects of the present invention include (but are not limited to) a method for creating a blockchain transaction that represents a function where:

- Function Input(s) are represented by the public keys used within the unlocking script of the transaction's input(s)
- Function Output(s) are represented by the addresses that the transaction's outputs are sent
- Function Procedure is evaluated external to the blockchain transaction
- The Function Input(s) can be locked in, before applying the Function logic and updating the Function Output(s)

Thus, the present invention includes the following:

- A technique for the distribution of a secret value; this can be achieved using methods which employ elliptic curve arithmetic so that a message can be embedded in private/public keys; in addition, the Shared Secret can be established across an unsecure network
- A technique for securely embedding a value in Elliptic Curve Public/Private Keys The invention includes a technique for Secret Value Distribution allowing values to be securely embedded in elliptic curve public/private cryptographic keys. The value can be extracted by the receiving party in linear time, but remains intractable for attackers even if the parameters communicated to establish the embedding method are compromised
- Bitcoin Transaction Outputs which are conditional on Inputs
- A novel and inventive method which first signs all of a transaction's inputs except one with SIGHASH_NONE (locks in inputs), and then signs the remaining input with SIGHASH_ALL (locks in inputs and outputs). This flow allows for outputs to be conditioned upon inputs.

The invention will be illustrated via use case examples provided below, in which blockchain (e.g. Bitcoin) transactions can be used to represent the functionality provided by a logic gate.

The invention utilizes techniques for embedding a message in cryptographic (public/private) keys, and also for establishing a shared secret. These are described as follows.

Message Embedding

Given:
- Private key V (an integer)
- Public key P (elliptic curve point)
- EC generator G (an elliptic curve function)
- Message M (a value which can be represented as an integer)

It is known in EC arithmetic that:
- P=V x G Elliptic Curve multiplication by scalar If message M is embedded:
- V'=V+M Integer addition
- P'=P+MxG Elliptic Curve Point addition
- V' and P' are the private/public keys with message M embedded Shared Secret Given:
- Party A with private key VA and public key PA
- Party B with private key VB and public key PB
- EC generator G (an elliptic curve function)

It is known in EC arithmetic that:

$P_A = V_A \times G$ $P_B = V_B \times G$

If both parties publish their public key, a shared secret can be securely established:

| Party A | Shared Secret = $V_A \times P_B$ | = $V_A \times (V_B \times G)$ |
| Party B | Shared Secret = $V_B \times P_A$ | = $V_B \times (V_A \times G)$ |

As EC arithmetic is commutative, the shared secret is equivalent for both parties.

Secure Value Embedding in Elliptic Curve Public/Private Keys

It is possible to embed a message (value) into EC public/private keys. In order to apply this concept as a method for securely communication between two parties, the following parameters are required:

| Parameter | Details |
|---|---|
| Base public key P | The public key from which all value embedded keys P' are derived |
| EC Generator G | Elliptic Curve function such as secp256k1 which is used by Bitcoin |
| Shared Secret S | As per the technique described above. Note that only the public keys from both parties need to be shared |

| Parameter | Details |
| --- | --- |
| Range or set of n values v_1, v_2, . . . , v_n | Limits the possible values the receiver of a value embedded key needs to check. This is necessary as embedding is a one directional operation which is computationally expensive. |
| Value embedding formula M | The underlying Elliptic Curve formula which embeds the value into a public key |

Embedding Value Method

A sending party can embed a value using a secure formula M such as:

V'=V+HASH(value+S) value embedded private key

P'=P+HASH(value ⊕ S)×G value embedded public key where:

P is a base or initial public key

G is an Elliptic Curve function, such as secp256k1 x denotes elliptic curve multiplication by scalar; and

⊕ denotes elliptic curve addition.

The security of this method incorporates and embodies the following points:

The value embedded public key uses EC arithmetic which is one directional and intractable to reverse.

The hashing function is one directional and difficult to reverse

Shared Secret S is used as a hash salt. This means that even if all other parameters are compromised, an attacker cannot simply iterate through the possible values to work out the embedded value. S is guaranteed to be secure unless the private keys are compromised.

Value Extracting Method

The receiver of a value embedded in a public key can extract the value in linear time. This is done by calculating a value-embedded public key for each possible value until a match is found. This can be achieved by:

| For each v in range v_0 to v_n v_n is a range, rather than a set | //In this particular script, v_0, v_1, . . . , |
| --- | --- |
| v' = M(v, P, S, G) to embed v | //M is the formula using EC arithmetic |
| If v' equals P' Exit loop | //v is the embedded value |

Blockchain Transaction Outputs Conditional on Inputs

This section presents a method for constructing a blockchain transaction where the outputs are conditioned on the inputs. This is based off knowledge about using signature types SIGHASH ALL and SIGHASH NONE which is available in the public domain: https://bitcoin.org/en/developer-guide #signature-hash-types Signature Types Bitcoin signatures are a hash of select parts of a Transaction. The parts that are selected are determined by the signature hash type. The signature secures the hashed parts as any modification will yield a different signature thus showing tampering. FIG. 1 shows an example transaction and the parts which are hashed with SIGHASH_ALL and SIGHASH_NONE. It should be noted that, when signing an input, the scriptSigLen & scriptSig of all other inputs are replaced with empty scripts.

Transaction Construction Method

1. The blockchain Transaction is created, and inputs are added by all entities
2. All entities, apart from Owner, sign their input with SIGHASH_NONE (this locks in the inputs so they cannot be modified)
3. The Owner determines the output, and updates the transaction
4. The Owner signs its input with SIGHASH_ALL, the transaction is now complete (this locks in both the inputs and the outputs)

Implementing an Externally Evaluated Function as a Blockchain Transaction

The invention can combine all of the previously described concepts/methods. Key aspects include are:

Input values to the function can be embedded in public keys which are communicated as transaction inputs The Owner of the function (i.e. the resource which is responsible for executing the function) can interrogate the transaction prior to publication on the Blockchain to implement the function.

The Owner of the function alone can modify the output address of the transaction prior to completion to represent the output of the function Key Terms For clarity the following terms will be used throughout to define the implementation and use cases of the present invention.

| Name | Type |
| --- | --- |
| Controller | The owner of the transaction representing a function. This is the only entity which can update the transaction's outputs even after inputs are signed |
| Input Sources | One of the entities which adds an input containing a Value Embedded PubKey to the transaction |
| Value Embedded PubKey | This is a cryptographic (Bitcoin) Public Key which has a value embedded in it with Elliptic Curve arithmetic |
| PubKey Protocol | A protocol where: The sender and receiver agrees on the set of parameters and embedding + extracting method as described above in the section relating to Secure Value Embedding in Elliptic Curve Public/Private Keys A sender communicates the Value Embedded PubKey through one of the input unlocking scripts in the receiver's transaction (the sender must let the receiver know which key has a value embedded) |

Implementation

Figure 2A:
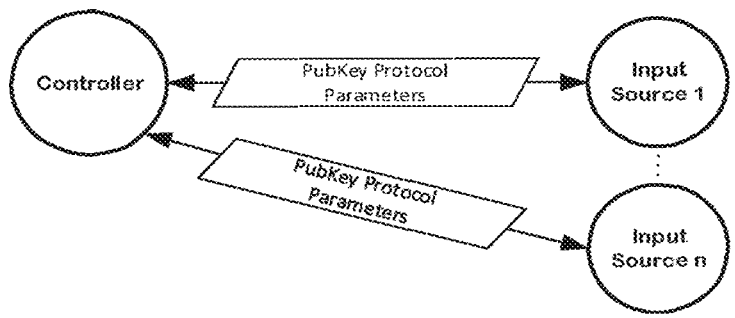
FIG. 2a shows how a function Controller establishes a PubKey Protocol with each Input Source.
Figure 2B:
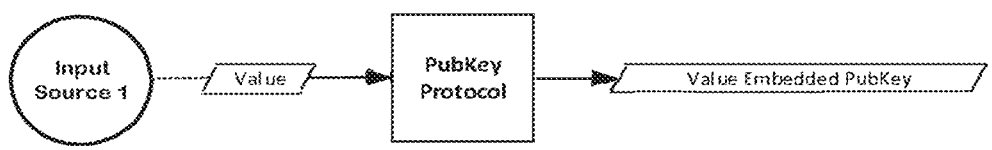
FIG. 2b illustrates a scenario wherein an input source has a value to communicate and calculates a value-embedded public key (PubKey) according to its protocol (PubKey protocol).
Figure 2C:
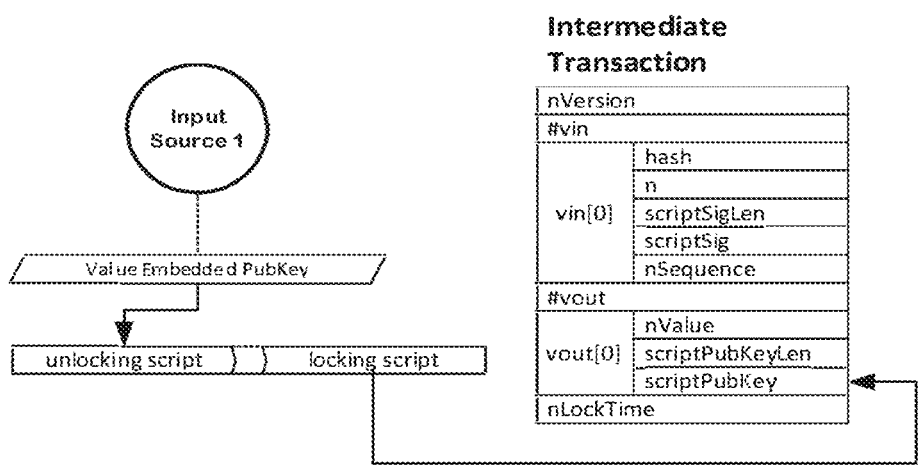
FIG. 2c illustrates a scenario wherein an input source uses the value-embedded PubKey to create a locking script which is used in one of the outputs of an intermediate transaction.
Figure 2D:
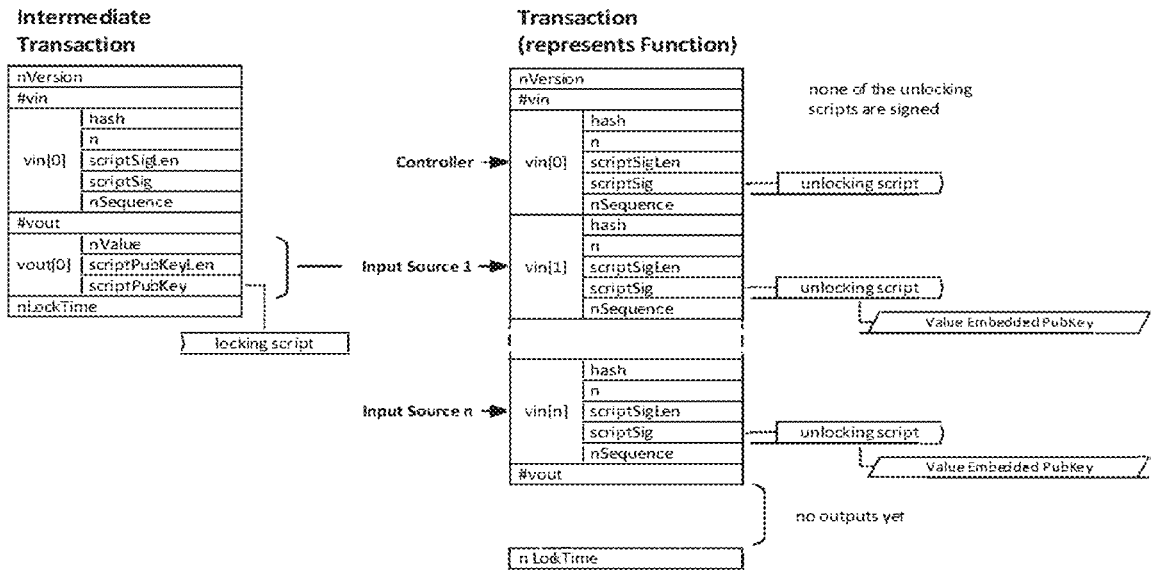
FIG. 2d illustrates a scenario wherein the Transaction is created; unsigned input from the Controller and each input is added
Figure 2E:
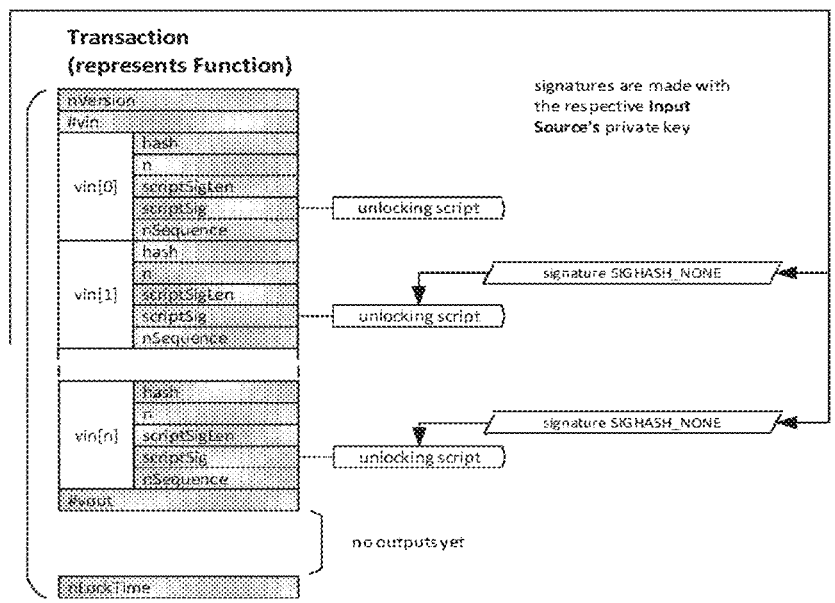
FIG. 2e illustrates a scenario wherein every input source signs their respective input to the Transaction with signature type SIGHASH NONE.
Figure 2F:
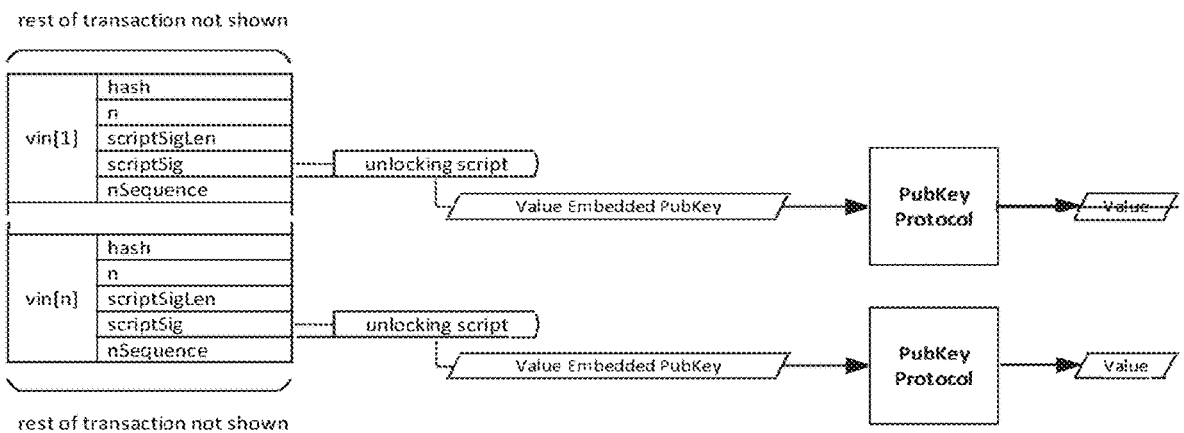
FIG. 2f illustrates a scenario wherein the Controller takes the value-embedded PubKey from each Input Source's unlocking scripts in the Transaction and extracts the embedded value based on the associated PubKey protocol
Figure 2G:
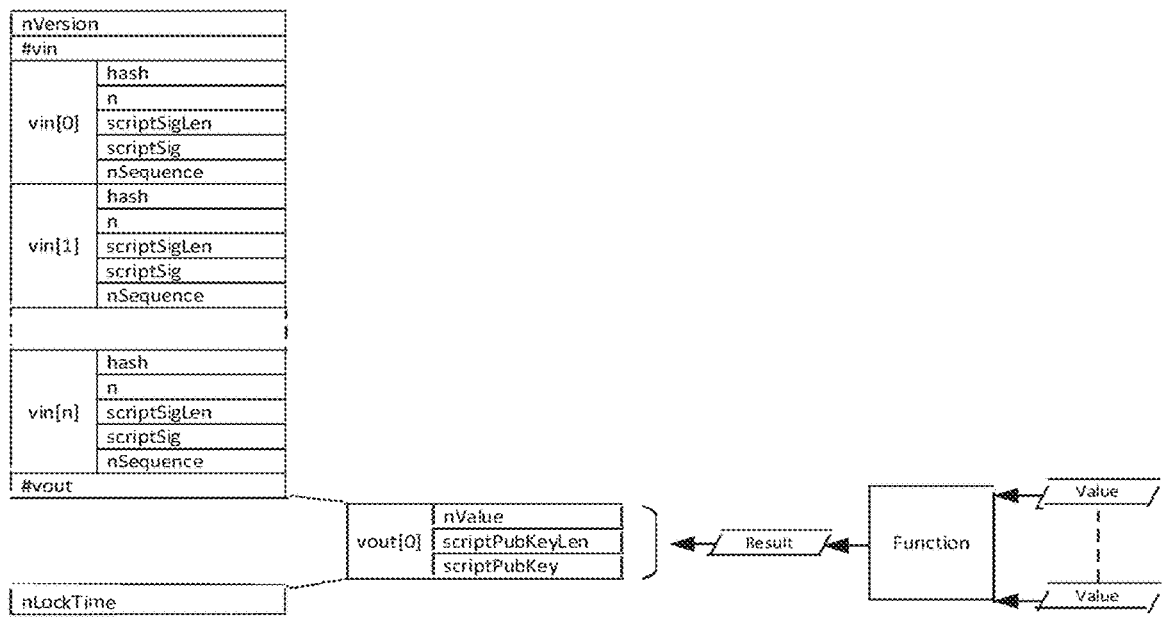
FIG. 2g illustrates a scenario wherein the Controller applies the function to the extracted values, and modifies the transaction output(s) based on the result.
Figure 2H:
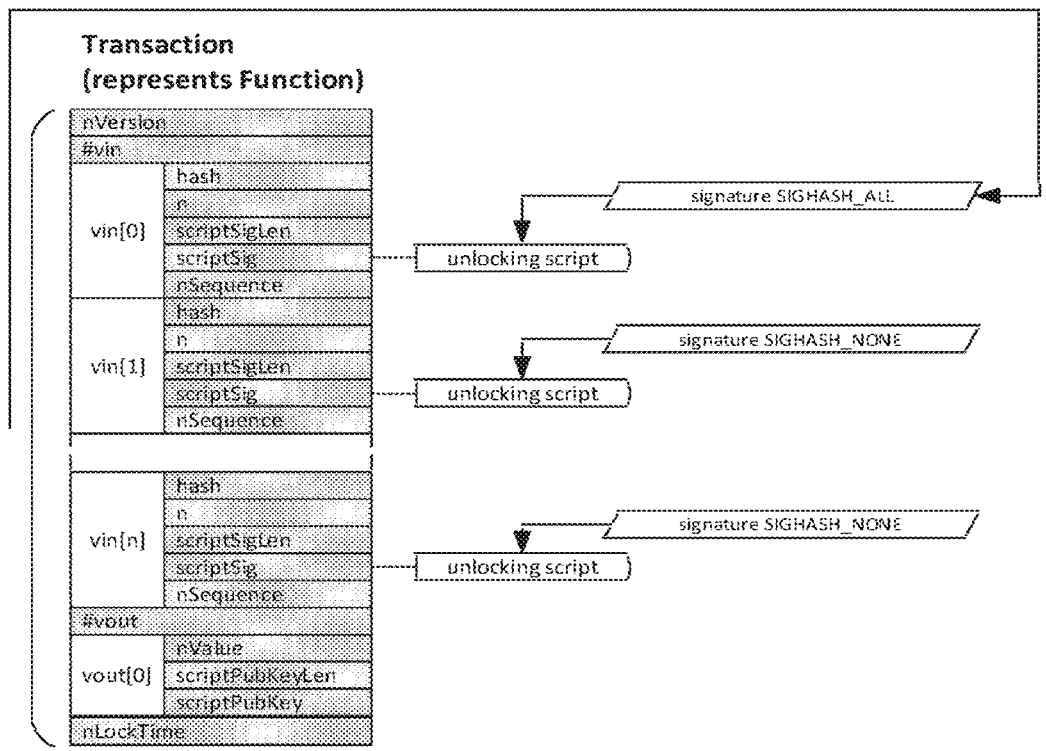
FIG. 2h illustrates a scenario wherein the Controller signs its input using SIGHASH_ALL and submits the transaction to the blockchain.

1. A Controller establishes a PubKey Protocol with each Input Source, as shown in FIG. 2a.
2. Input Source has a value to communicate and calculates a Value Embedded PubKey according to its PubKey Protocol, as shown in FIG. 2b
3. Input Source uses the Value Embedded PubKey to create a locking script which is used in one of the outputs of an Intermediate Transaction (created by Input Source). The Intermediate Transaction is submitted to the blockchain; it is not important whether the locking script is P2PKH or P2SH. This is shown in FIG. 2c.
4. Transaction is created and unsigned input from Controller and each Input Source are added; see FIG. 2d
   a. The inputs by each Input Source references their intermediate transaction, specifically the output with the Value Embedded PubKey
   b. It is not important whether this transaction or the intermediate transactions are created first (i.e. order of steps 2-3), as long as all inputs are added to this transaction before step 4
   c. It is not important who creates the transaction as long as all parties involved can modify it 5. Every Input Source signs their input to the transaction with signature hash type SIGHASH_NONE
   a. This locks in the inputs, but leaves the outputs free to be modified
   b. It is not important how each Input Source is informed/checks when all inputs are added
6. Controller takes the Value Embedded PubKey from each Input Source's unlocking scripts in the transaction and extracts the value embedded based on the associated PubKey Protocol; see FIG. 2f.
   a. The value extraction is done externally to the bitcoin transaction
   b. It is not important how the Controller is informed/checks when all inputs by Input Sources are signed
7. Controller applies the function to the extracted values, and modifies the transaction output(s) based on the result; see FIG. 2g.
   a. The function is applied external to the bitcoin transaction
8. Controller signs its input using SIGHASH_ALL, and submits the transaction to the blockchain; see FIG. 2h.

Use Case Example 1: XOR Logic Gate

We now present, for the purposes of illustration, an example use cases which implements present invention by using a (Bitcoin) transaction to represent an XOR logic gate with two input sources. Consider the following scenario.

Alice is a self-taught trader who sees an opportunity to make extra income by trading Company XYZ Stock Options. She opens an account with a particular Online Stock Exchange which accepts payments in Bitcoin. Alice develops a simple Trading Bot, Share Prices Bot, and a Market Index Value Bot. (Each "bot" is a computer-based resource arranged to perform an automated task or process).

The Share Prices Bot and Market Index Value Bot are setup such that:

Both bots record opening value range of the stock market.
Both bots communicate with the Trading Bot if one of the bots sees a value change to another range during the day
Share Prices Bot scrapes:
   Price of Share XYZ—{P1, P2, . . . , P10}*
Market Index Value Bot scrapes:
   Market Index Value—{M1, M2, . . . , M5}*
represent ranges of values in ascending order. P1<P2< . . . <P10

The Trading Bot buys call and put options based on the market data it receives:

| Input (Price of Share XYZ) | Input (Market Index Value) | Output |
|---|---|---|
| p ∈ {P7, P8, P9, P10} - True | m ∈ {M1, M2} - True | False - Buy Put Option - High prices but weak market. Alice predicts price will drop |
| p ∈ {P7, P8, P9, P10} - True | m ∈ {M1, M2} - False | True - Buy Call Option - High prices but strong market. Alice predicts price will rise |
| p ∈ {P7, P8, P9, P10} - False | m ∈ {M1, M2} - True | True - Buy Call Option - Low prices and weak market. Alice predicts price will rise |
| p ∈ {P7, P8, P9, P10} - False | m ∈ {M1, M2} - False | False - Buy Put Option - Low prices and strong market. Alice predicts price will drop |

It is important to note that the Share Prices Bot and Market Index Bot only send market data, they do not know the strategy.

Existing Set Up

Alice has given Trading Bot private/public key pair A which has 5BTC.
Alice has given Share Prices Bot private/public key pair X which has 1BTC
Alice has given Market Index Value Bot private/public key pair Y which has 1BTC
Exchange takes payments for Put and Call Options at public key E_PUT and E CALL respectively Steps:
1. Alice runs all three bots for the first time:
   a. Trading Bot establishes a PubKey Protocol with Share Prices Bot with the following parameters:

| Parameter | Details |
|---|---|
| Base public key | Public Key X |
| EC Generator G | secp256k1 |
| Shared Secret S | (Private Key A) × (Private Key X) × G Trading Bot and Share Prices Bot calculates this by using each other's public key |
| Range or set of values | P1, P2, . . . , P10 |
| Value embedding formula | X' = X + SHA256(value 4 S) × G |
| Key Communicating Method | Pay to Public Key Hash (P2PKH) | b. Trading Bot establishes a PubKey Protocol with Market Index Value Bot with the following parameters:

| Parameter | Details |
|---|---|
| Base public key | Public Key Y |
| EC Generator G | secp256k1 |
| Shared Secret S | (Private Key A) × (Private Key Y) × G Trading Bot and Market Index Value Bot calculates this by using each other's public key |
| Range or set of values | M1, M2, . . . , M5 |
| Value embedding formula | Y' = Y + SHA256(value + S) × G |
| Key Communicating Method | Pay to Public Key Hash (P2PKH) |

2. Share Prices Bot and Market Index Value Bot records the opening value range of the stock market as P5 and M3 respectively
3. Market Index Value Bot detects a change to M2. Both bots calculate a Value Embedded PubKey to send to Trade Bot
   a. Stock Price Bot:
      i. $X' = X + SHA256(P5 + S) \times G$
   b. Market Index Value Bot:
      i. $Y' = Y + SHA256(M2 + S) \times G$
4. Both bots create and submit to the blockchain an Intermediate Transaction with an output which requires a P2PKH unlocking script with their Value Embedded PubKey;
   See FIG. 3 for the Stock Price Bot's Intermediate Transaction. Note that output 1 requires the unlocking script with Value Embedded PubKey X'; Output 2 is change back to Stock Price Bot
   See FIG. 4 for the Market Index Value Bot's Intermediate Transaction; Note that output 1 requires the unlocking script with Value Embedded PubKey Y'; Output 2 is change back to Stock Price Bot 5. Both bots send Trading Bot an unsigned transaction input containing their respective Value Embedded PubKey See FIG. 5a for the Stock Price Bot's Input See FIG. 5b for the Market Index Value Bot's Input
6. See FIG. 6: Trading Bot creates the transaction representing an XOR gate including the transaction inputs received from Stock Price Bot and Market Index Value Bot
7. See FIG. 7: Trading Bot informs Stock Price Bot and Market Index Value Bot of the transaction's storage/access details and requests them to sign their input.
   a. Both bots sign with SIGHASH_NONE, locking in the inputs
8. Trading Bot takes <PubKey X'> from the unlocking script, and calculates Value Embedded PubKeys for P1, P2, . . . , P10 until it finds a matching pubkey with P5
9. Trading Bot takes <PubKey Y'> from the unlocking script, and calculates Value Embedded PubKeys for M1, M2, . . . , M5 until it finds a matching pubkey with M2
10. Trading Bot takes applies the XOR logic gate to the values, and determines that it should buy a call option
    a. P5∈{P7, P8, P9, P10} XOR M2∈{M1, M2}
    b. FALSE XOR TRUE
    c. TRUE-buy call option
11. See FIG. 8: Trading Bot updates the output to send 5BTC to E_PUT, signs its output with SIGHASH_ALL, and submits to the blockchain Use Case Example 2: AND Logic Gate Implements the Bitcoin transaction to represent an AND logic gate with two input sources Imagine a bank that contains a vault with a dual control (dual custody) electronic combination lock. No single person is given both combinations, the simultaneous presence of two bank managers is required to open the door. If both combinations are correctly entered at the same time ('1111' and '2222'), the vault door will unlock, otherwise the vault alarm is activated. This is an implementation of an AND gate.

The whole system consists of 4 entities: Combination Lock A, Combination Lock B, Controller, and Vault AND Logic in Controller: Combination A=='1111' AND Combination B=='2222'

| Input Signal from Combination Lock A to Controller | Input Signal from Combination Lock B to Controller | Controller AND Logic | Output Signal from Controller to Vault |
|---|---|---|---|
| 1111 | 2222 | TRUE | Unlock Door |
| 1111 | All other 4 digit combinations besides 2222 | FALSE | Activate Alarm |
| All other 4 digit combinations besides 1111 | 2222 | FALSE | Activate Alarm |
| All other 4 digit combinations besides 1111 | All other 4 digit combinations besides 2222 | FALSE | Activate Alarm |

It should be noted that all logic evaluation is performed by the Controller. The Combination Locks simply sends the 4 digit code but does not evaluate whether the code is TRUE or FALSE.

Existing Setup

Combination Lock A owns private/public key pair A which has 1BTC

Combination Lock B owns private/public key pair B which has 1BTC

Controller owns private/public key pair C which has 1BTC

Vault owns private/public key pair V_DOOR and V_ALARM

Steps:
1. When the system was first installed, Controller established a PubKey Protocol with Combination Lock A and Combination Lock B to allow secure communication of signals:
   a. Controller & Combination Lock A's PubKey Protocol parameters:

| Parameter | Details |
|---|---|
| Base public key | Public Key A (owned by Combination Lock A) |
| EC Generator G | secp256k1 |
| Shared Secret S | (Private Key A) × (Private Key C) × G Controller & Combination Lock A calculates this by using each other's public key |
| Range or set of values | 0000, 0001, . . . , 9998, 9999 |
| Value embedding formula | PubKey A' = PubKey A + SHA256(value + S) × G |
| Key Communicating Method | Pay to Public Key Hash (P2PKH) | b. Controller & Combination Lock B's PubKey Protocol parameters:

| Parameter | Details |
|---|---|
| Base public key | Public Key B (owned by Combination Lock B) |
| EC Generator G | secp256k1 |
| Shared Secret S | (Private Key B) × (Private Key C) × G Controller & Combination Lock B calculates this by using each other's public key |
| Range or set of values | 0000, 0001, .... , 9998, 9999 |
| Value embedding formula | PubKey B' = PubKey B + SHA256(value + S) × G |
| Key Communicating Method | Pay to Public Key Hash (P2PKH) |

2. Bank Managers simultaneously enter their respective 4 digit code (1111 and 2222) into Combination Lock A and Combination Lock B. Each Combination Lock embeds their 4 digit code into a Value Embedded PubKey (PubKey A' and PubKey B')
   a. Combination Lock A:
      i. PubKey A'=PubKey A+SHA256('1111'+ S)×G
   b. Combination Lock B:
      i. PubKey B'=PubKey B+SHA256('2222'+ S)×G 3. Both Combination Locks create and submit to the blockchain a Bitcoin transaction (Intermediate Transaction) with an output to their respective Value Embedded PubKey
   a. Combination Lock A's Intermediate Transaction: See FIG. 9
      Output 1—the input spending this output will communicate PubKey A' to the Controller
      Output 2—change back to Combination Lock A's public key A
   b. Combination Lock B's Intermediate Transaction: See FIG. 10
      Output 1—the input spending this output will communicate PubKey B' to the Controller
      Output 2—change back to Combination Lock B's public key B
4. Both Combination Locks create an unsigned Bitcoin transaction input which spends output 1 of their respective Intermediate Transaction. They send this input to the Controller—See FIG. 11 for
   a. Combination Lock A's transaction input
   b. Combination Lock B's transaction input:
5. Controller uses the Bitcoin transaction inputs from the Combination Locks and creates a Bitcoin transaction representing an AND gate (AND Gate Transaction). This transaction includes an input from the Controller itself, so that it alone can modify the outputs. See FIG. 12
6. Controller requests for Combination Lock A and Combination Lock B to sign their respective input in the AND Gate Transaction using SIGHASH_NONE. This locks in the inputs, while still allowing the outputs to be modified-See FIG. 13
7. Controller uses its PubKey Protocol with Combination Lock A to calculate a Value Embedded PubKey for each 4 digit combination 0000, 0001, . . . , 9998, 9999 until it finds one which matches PubKey A'
   a. Controller finds that '1111' produces the same Value Embedded PubKey as PubKey A'
8. Controller uses its PubKey Protocol with Combination Lock B to calculate a Value Embedded PubKey for each 4 digit combination 0000, 0001, . . . , 9998, 9999 until it finds one which matches PubKey B'
   a. Controller finds that '2222' produces the same Value Embedded PubKey as PubKey B'
9. Controller applies the AND gate logic to the combinations:
   a. Combination A='1111' AND Combination B='2222'
   b. TRUE AND TRUE
   c. TRUE-send signal to V_DOOR to unlock door
10. Controller updates AND Gate Transaction's output to send signal to V_DOOR and to give change back to itself. It then signs its input with SIGHASH_ALL to lock in all inputs and outputs, and submits to the blockchain: See FIG. 14
11. Vault upon seeing a transaction output to V DOOR, unlocks the vault door Use Case Example 3: IMPLY Logic Gate In this example we implement the Bitcoin transaction to represent an IMPLY logic gate with two input sources. Imagine a plane with two switches, Switch A which turns on/off manual mode, and Switch B which turns on/off the landing gear extending system. If Switch A is off (auto-landing), the landing gear is always extended regardless of Switch B. Switch A is on (manual mode), the landing gear is extended based on Switch B. This is an implementation of an IMPLY gate. The whole system consists of 4 entities: Switch A, Switch B, Controller, and Landing Gear.

| IMPLY Logic in Controller: Switch A == On IMPLY Switch B == On | | | |
| --- | --- | --- | --- |
| Input Signal from Switch A to Controller | Input Signal from Switch B to Controller | Controller IMPLY Logic | Output Signal from Controller to Landing Gear Extending System |
| Off | Off | TRUE (auto-mode, always extend) | Extend |
| Off | On | TRUE (auto-mode, always extend) | Extend |
| On | Off | FALSE (manual-mode, extend based on switch B) | Retract |
| On | On | TRUE (manual-mode, extend based on switch B) | Extend |

All logic evaluation is performed by the Controller. The Switches simply send their state.

Existing Set up
   Switch A owns private/public key pair A which has 1BTC
   Switch B owns private/public key pair B which has 1BTC
   Controller owns private/public key pair C which has 1BTC
   Landing Gear Extending System owns private/public key pair L_EXTEND and L_RETRACT Steps
1. When the system was first installed, Controller established a PubKey Protocol with Switch A and Switch B to allow secure communication of signals:
   a Controller & Switch A's PubKey Protocol parameters:

| Parameter | Details |
| --- | --- |
| Base public key | Public Key A (owned by Switch A) |
| EC Generator G | secp256k1 |
| Shared Secret S | (Private Key A) × (Private Key C) × G Controller & Switch A calculates this by using each other's public key |
| Range or set of values | On, Off |
| Value embedding formula | PubKey A' = PubKey A + SHA256(value + S) × G |
| Key Communicating Method | Pay to Public Key Hash (P2PKH) | b. Controller & Switch B's PubKey Protocol parameters:

| Parameter | Details |
|---|---|
| Base public key | Public Key B (owned by Switch B) |
| EC Generator G | secp256k1 |
| Shared Secret S | (Private Key B) × (Private Key C) × G Controller & Switch B calculates this by using each other's public key |
| Range or set of values | On, Off |
| Value embedding formula | PubKey B' = PubKey B + SHA256(value ○ S) × G |
| Key Communicating Method | Pay to Public Key Hash (P2PKH) |

2. Manual Mode is currently engaged (Switch A is on), and the Landing Gears are retracted (Switch B is off).
3. The Pilot prepares for landing and turns Switch A off (auto-landing). Each Switch embeds their state into a Value Embedded PubKey (PubKey A' and PubKey B')
   a. Switch A:
      i. PubKey A'=PubKey A+SHA256(Off ⊕ S)×G
   b. Switch B:
      i. PubKey B'=PubKey B+SHA256(Off ⊕ S)×G
4. Both Switches create and submit to the blockchain a Bitcoin transaction (Intermediate Transaction) with an output to their respective Value Embedded PubKey
   a. Switch A's Intermediate Transaction: See FIG. 15
      Output 1—the input spending this output will communicate PubKey A' to the Controller
      Output 2—change back to Switch A's public key A
   b. Switch B's Intermediate Transaction: see FIG. 16
      Output 1—the input spending this output will communicate PubKey B' to the Controller
      Output 2—change back to Switch B's public key B
5. Both Switches create an unsigned Bitcoin transaction input which spends output 1 of their respective Intermediate Transaction. They send this input to the Controller: see FIG. 17 for
   a. Switch A's transaction input
   b. Switch B's transaction input
6. Controller uses the Bitcoin transaction inputs from the Switches and creates a Bitcoin transaction representing an IMPLY gate (IMPLY Gate Transaction). This transaction includes an input from the Controller itself, so that it alone can modify the outputs. See FIG. 18
7. Controller requests for Switch A and Switch B to sign their respective input in the IMPLY Gate Transaction using SIGHASH_NONE. This locks in the inputs, while still allowing the outputs to be modified-See FIG. 19
8. Controller uses its PubKey Protocol with Switch A to calculate a Value Embedded PubKey for On and Off, to find a match with PubKey A' a. Controller finds that Off produces the same Value Embedded PubKey as PubKey A'
9. Controller uses its PubKey Protocol with Switch A to calculate a Value Embedded PubKey for On and Off, to find a match with PubKey B' a. Controller finds that Off produces the same Value Embedded PubKey as PubKey B'
10. Controller applies the IMPLY gate logic:
    a. Switch A==On IMPLY Switch B==On
    b. Off==On IMPLY Off==On
    c. FALSE IMPLY FALSE
    d. TRUE—send signal to L_EXTEND to extend the landing gear
11. Controller updates IMPLY Gate Transaction's output to send signal to L_EXTEND and to give change back to itself. It then signs its input with SIGHASH_ALL to lock in all inputs and outputs, and submits to the blockchain: See FIG. 20
12. Landing Gear Extending System upon seeing a transaction output to L_EXTEND, turns on Use Case Example 4: NAND Logic Gate In this example, we implements the Bitcoin transaction to represent an NAND logic gate with two input sources. In a car each door typically has a switch that opens when the door is open, and if one or more doors are open a warning light is switched on to warn the driver. This is an implementation of a NAND gate. The whole system consists of 4 entities: Switch A, Switch B, Controller, and Light. Both Switches send a signal to the Controller when one of them changes state NAND Logic in Controller: Switch A = Closed NAND Switch B = Closed

| Input Signal from Switch A to Controller | Input Signal from Switch B to Controller | Controller NAND Logic | Output Signal from Controller to Light |
|---|---|---|---|
| Open | Open | TRUE | Turn On |
| Open | Closed | TRUE | Turn On |
| Closed | Open | TRUE | Turn On |
| Closed | Closed | FALSE | Turn Off |

All logic evaluation is performed by the Controller. The Switches simply sends their open or closed state to the Controller.

Existing Set Up
  Switch A owns private/public key pair A which has 1BTC
  Switch B owns private/public key pair B which has 1BTC
  Controller owns private/public key pair C which has 1BTC
  Light owns private/public key pair L_TURNON and L TURNOFF
Steps:
  1. When the system was first installed, Controller established a PubKey Protocol with Switch A and Switch B to allow secure communication of signals:
     a. Controller & Switch A's PubKey Protocol parameters:

| Parameter | Details |
|---|---|
| Base public key | Public Key A (owned by Combination Lock A) |
| EC Generator G | secp256k1 |
| Shared Secret S | (Private Key A) × (Private Key C) × G Controller & Switch A calculates this by using each other's public key |
| Range or set of values | Open, Closed (mapped to any unique pair of numbers) |
| Value embedding formula | PubKey A' = PubKey A + SHA256(value ⊕ S) × G |
| Key Communicating Method | Pay to Public Key Hash (P2PKH) | b. Controller & Switch B's PubKey Protocol parameters:

| Parameter | Details |
|---|---|
| Base public key | Public Key B (owned by Combination Lock B) |
| EC Generator G | secp256k1 |
| Shared Secret S | (Private Key B) × (Private Key C) × G Controller & Switch B calculates this by using each other's public key |
| Range or set of values | Open, Closed (mapped to any unique pair of numbers) |
| Value embedding formula | PubKey B' = PubKey B + SHA256(value ⊕ S) × G |
| Key Communicating Method | Pay to Public Key Hash (P2PKH) |

2. Switch A detects that its door has changed from closed opened, while Switch B detects that its door remains closed. Each Switch embeds their respective state (Open and Close) into a Value Embedded PubKey (PubKey A' and PubKey B')
   a. Switch A:
      i. PubKey A'=PubKey A+SHA256('Open' ⊕ S)×G
   b. Switch B:
      i. PubKey B'=PubKey B+SHA256('Close' ⊕ S)×G
3. See FIG. 21a and FIG. 21b. Both Switches create and submit to the blockchain a Bitcoin transaction (Intermediate Transaction) with an output to their respective Value Embedded PubKey
   a. Switch A's Intermediate Transaction: FIG. 21a
      Output 1—the input spending this output will communicate PubKey A' to the Controller
      Output 2—change back to Switch A's public key A
   b. Switch B's Intermediate Transaction: FIG. 21b
      Output 1—the input spending this output will communicate PubKey B' to the Controller
      Output 2—change back to Switch B's public key B
4. Both Switches send the Controller an unsigned Bitcoin transaction input which spends output 1 of their respective Intermediate Transaction. See FIG. 22 for
   a. Switch A's transaction input:
   b. Switch B's transaction input:
5. Controller uses the Bitcoin transaction inputs from the Switches and creates a Bitcoin transaction representing a NAND gate (NAND Gate Transaction). This transaction includes an input from the Controller itself, so that it alone can modify the outputs. See FIG. 23
6. Controller requests for Switch A and Switch B to sign their respective input in the NAND Gate Transaction using SIGHASH_NONE. This locks in the inputs, while still allowing the outputs to be modified. See FIG. 24
7. Controller uses its PubKey Protocol with Switch A to calculate a Value Embedded PubKey for each state Open and Close.
   a Controller finds that 'Open' produces the same Value Embedded PubKey as PubKey A'
   b. Controller uses its PubKey Protocol with Switch B to calculate a Value Embedded PubKey for each state Open and Close Controller finds that 'Close' produces the same Value Embedded PubKey as PubKey B'
8. Controller applies the NAND gate logic to the switch states:
   a. Switch A=Closed NAND Switch B=Closed
   b. FALSE NAND TRUE
   c. TRUE-send signal to L_TURNON to turn on light
9. Controller updates NAND Gate Transaction's output to send signal to L_TURNON and to give change back to itself. It then signs its input with SIGHASH_ALL to lock in all inputs and outputs, and submits to the blockchain. See FIG. 25.
10. Light upon seeing a transaction output to L_TURNON, turns on Use Case Example 5: NONIMPLY Logic Gate In the example we implement the Bitcoin transaction to represent a NONIMPLY logic gate with two input sources. Imagine a smart driveway lighting system which has Sensor A which detects the presence of a car, and Switch B which turns on/off manual only mode. If Sensor A does not detect a car, the driveway light is off. If Sensor A detects a car, it automatically turns on the driveway light if Switch B manual mode is off. This is an implementation of a NONIMPLY gate. The whole system consists of 4 entities: Sensor A, Switch B, Controller, and Driveway Light

| NONIMPLY Logic in Controller: Sensor A == 'Car' IMPLY Switch B == 'Manual On' | | | |
|---|---|---|---|
| Input Signal from Switch A to Controller | Input Signal from Switch B to Controller | Controller NONIMPLY Logic | Output Signal from Controller to Driveway Light |
| No Car | Manual Off | FALSE | Turn Off Driveway Light |
| No Car | Manual On | FALSE | Turn Off Driveway Light |
| Car | Manual Off | TRUE | Turn On Driveway Light |
| Car | Manual On | FALSE | Turn Off Driveway Light |

All logic evaluation is performed by the Controller. The Sensor and Switch simply sends their state.

Existing Setup:
  Sensor A owns private/public key pair A which has 1BTC
  Switch B owns private/public key pair B which has 1BTC
  Controller owns private/public key pair C which has 1BTC
  Driveway Light owns private/public key pair L ON and L OFF Steps:
1. When the system was first installed, Controller established a PubKey Protocol with Sensor A and Switch B to allow secure communication of signals:
   a. Controller & Sensor A's PubKey Protocol parameters:

| Parameter | Details |
|---|---|
| Base public key | Public Key A (owned by Switch A) |
| EC Generator G | secp256k1 |
| Shared Secret S | (Private Key A) × (Private Key C) × G Controller & Sensor A calculates this by using each other's public key |
| Range or set of values | Car, No Car |
| Value embedding formula | PubKey A' = PubKey A + SHA256(value ⊕ S) × G |
| Key Communicating Method | Pay to Public Key Hash (P2PKH) | b. Controller & Switch B's PubKey Protocol parameters:

| Parameter | Details |
|---|---|
| Base public key | Public Key B (owned by Switch B) |
| EC Generator G | secp256k1 |
| Shared Secret S | (Private Key B) × (Private Key C) × G Controller & Switch B calculates this by using each other's public key |
| Range or set of values | Manual On, Manual Off |
| Value embedding formula | PubKey B' = PubKey B + SHA256(value ⊕ S) × G |
| Key Communicating Method | Pay to Public Key Hash (P2PKH) |

2. Sensor A currently detects no cars and Switch B has manual mode turned off.
3. Sensor A detects a car on the driveway. The Sensor and Switch embeds their state into a Value Embedded PubKey (PubKey A' and PubKey B')
    a. Sensor A:
        i. PubKey A'=PubKey A+SHA256(Car ⊕ S)×G
    b. Switch B:
        i. PubKey B'=PubKey B+SHA256 (Manual Off ⊕ S)×G
4. Both Switches create and submit to the blockchain a Bitcoin transaction (Intermediate Transaction) with an output to their respective Value Embedded PubKey
    a. Sensor A's Intermediate Transaction: FIG. 26a
        Output 1—the input spending this output will communicate PubKey A' to the Controller
        Output 2—change back to Switch A's public key A
    b. Switch B's Intermediate Transaction: FIG. 26b
        Output 1—the input spending this output will communicate PubKey B' to the Controller
        Output 2—change back to Switch B's public key B
5. Sensor A and Switch B create an unsigned Bitcoin transaction input which spends output 1 of their respective Intermediate Transaction. They send this input to the Controller. See FIG. 27 for
    a. Sensor A's transaction input:
    b. switch B's transaction input:
6. Controller uses the Bitcoin transaction inputs from the Sensor and Switch to create a Bitcoin transaction representing a NONIMPLY gate (NONIMPLY Gate Transaction). This transaction includes an input from the Controller itself, so that it alone can modify the outputs. See FIG. 28.
7. Controller requests for Sensor A and Switch B to sign their respective input in the NONIMPLY Gate Transaction using SIGHASH_NONE. This locks in the inputs, while still allowing the outputs to be modified. See FIG. 29.
8. Controller uses its PubKey Protocol with Sensor A to calculate a Value Embedded PubKey for Car and No Car, to find a match with PubKey A'
    a Controller finds that Car produces the same Value Embedded PubKey as PubKey A'
9. Controller uses its PubKey Protocol with Switch A to calculate a Value Embedded PubKey for Manual On and Manual Off, to find a match with PubKey B'
    a. Controller finds that Manual Off produces the same Value Embedded PubKey as PubKey B'
10. Controller applies the NONIMPLY gate logic:
    a. Sensor A=='Car' NONIMPLY Switch B=='Manual On'
    b. 'Car'=='Car' NONIMPLY 'Manual Off'=='Manual On'
    c. TRUE IMPLY FALSE
    d. TRUE-send signal to L_ON to turn on driveway light
11. Controller updates NONIMPLY Gate Transaction's output to send signal to LON and to give change back to itself. It then signs its input with SIGHASH_ALL to lock in all inputs and outputs, and submits to the blockchain. See FIG. 30.
12. Driveway light upon seeing a transaction output to L_ON, turns on Use Case Example 6: NOT Logic Gate In this example we implement the Bitcoin transaction to represent a NOT logic gate with one input source. Imagine that the Crown Jewels in the Tower of London are displayed to millions of visitors every year. Imagine that the Imperial State Crown sits upon a pressure sensitive switch that is normally closed. Placing the crown on the switch arms the alarm. Removing the crown from the switch activates the alarm. This is an implementation of a NOT gate. The whole system consists of a controller, a switch, and an alarm. The Switch sends a signal to the Controller when it changes state.

NOT Logic in Controller: NOT Switch=Closed

| Signal from Switch | Controller NOT logic | Output Signal from Controller to Alarm |
|---|---|---|
| Closed | False | Activate Alarm |
| Open | True | Arm Alarm |

Existing Setup
    Switch owns private/public key pair X which has 1BTC
    Controller owns private/public key pair C which has 1BTC
    Alarm owns private/public key pairs A_Activate and A_Arm Steps:
    1. During installation, Controller and Switch establishes a PubKey Protocol with the following parameters:

| Parameter | Details |
|---|---|
| Base public key | Public Key X (uses Switch's public key) |
| EC Generator G | secp256k1 |
| Shared Secret S | (Private Key C) × (Private Key X) × G Controller and Switch calculates this by using each other's public key |
| Range or set of values | True, False |
| Value embedding formula | PubKey X' = PubKey X + SHA256(value ⊕ S) × G |
| Key Communicating Method | Pay to Public Key Hash (P2PKH) |

2. Switch is initially in closed state (crown is on the switch)
3. Switch detects a change when the crown is removed. Switch embeds signal 'false' into a Value Embedded PubKey (PubKey X')
    a. PubKey X'=PubKey X+SHA256('false' ⊕ S)×G
4. Switch creates and submits to the blockchain an Intermediate Transaction with an output to its Value Embedded PubKey. See FIG. 31
    Output 1—the input spending this output will communicate PubKey X' to the Controller
    Output 2—change back to Switch X's public key A
5. Switch sends Controller an unsigned Bitcoin transaction input spending Output 1 of the Intermediate Transaction. See FIG. 32

6. Controller creates a Bitcoin transaction representing an NOT gate (NOT Gate Transaction) including the Bitcoin transaction input received from Switch. See FIG. 33
7. Controller requests Switch to sign its input in NOT Gate Transaction so that it is locked in
   a. Switch signs with SIGHASH_NONE, preventing it from being modified: FIG. 34
8. Controller calculates Value Embedded PubKey for 'true' and 'false', and compares it with the Value Embedded PubKey (PubKey X') from the unlocking script. It finds a match with 'false'
9. Controller applies the NOT gate to the value 'false', and determines that it should send a signal to Activate Alarm (A_ACTIVATE)
10. Controller updates NOT Gate Transaction's output to send a signal to A ACTIVATE and change back to its own public key C. It then signs is input with SIGHASH_ALL, and submits to the blockchain. See FIG. 35
    Output 1—Signal to Activate Alarm
    Output 2—Change back to Controller's public key C
11. Alarm upon seeing a transaction output to A_ACTIVATE, activates Use Case Example 7: OR Logic Gate Implements the Bitcoin transaction to represent an OR logic gate with two input sources Consider a building with an automated airflow system which uses an internal and external temperature sensor. The temperature sensors reads integer degrees Celsius from −30 to 50. If the internal temperature is above 21 or the external temperature is above 25, the airflow system expels cool air, otherwise the airflow system expels warm air. This is an implementation of an OR gate. The whole system consists of 4 entities: Temp. Sensor A, Temp. Sensor B, Controller, and Airflow System. Both sensors send a signal to the controller when either one detects a change in temperature.

| OR Logic in Controller: Temp. A > 21 OR Temp. B > 25 | | | |
| --- | --- | --- | --- |
| Input Signal from Temp. Sensor A to Controller | Input Signal from Temp. Sensor B to Controller | Controller OR Logic | Output Signal from Controller to Prod. System |
| 21, 22, . . . , 49, 50 | 26, 27, . . . , 49, 50 | TRUE | Cool Air |
| 21, 22, . . . , 49, 50 | −30, −29, . . . , 24, 25 | TRUE | Cool Air |
| −30, −29, . . . , 19, 20 | 26, 27, . . . , 49, 50 | TRUE | Cool Air |
| −30, −29, . . . , 19, 20 | −30, −29, . . . , 24, 25 | FALSE | Warm Air |

All logic evaluation is performed by the Controller. The Temp. Sensors simply sends the temperature reading but does not evaluate whether it is hot or cold.

Existing Setup
   Temp. Sensor A owns private/public key pair A which has 1BTC
   Temp. Sensor B owns private/public key pair B which has 1BTC
   Controller owns private/public key pair C which has 1BTC
   Airflow System owns private/public key pair S_COOL and S_WARM Steps
1. When the system was first installed, Controller established a PubKey Protocol with Temp. Sensor A and Temp. Sensor B to allow secure communication of signals:
   a. Controller & Temp. Sensor A's PubKey Protocol parameters:

| Parameter | Details |
| --- | --- |
| Base public key | Public Key A (owned by Temp. Sensor A) |
| EC Generator G | secp256k1 |
| Shared Secret S | (Private Key A) × (Private Key C) × G Controller & Temp. Sensor A calculates this by using each other's public key |
| Range or set of values | −30, −29, . . . , 49, 50 |
| Value embedding formula | PubKey A' = PubKey A + SHA256(value ⊕ S) × G |
| Key Communicating Method | Pay to Public Key Hash (P2PKH) | b. Controller & Temp. Sensor B's PubKey Protocol parameters:

| Parameter | Details |
| --- | --- |
| Base public key | Public Key B (owned by Temp. Sensor B) |
| EC Generator G | secp256k1 |
| Shared Secret S | (Private Key B) × (Private Key C) × G Controller & Temp. Sensor B calculates this by using each other's public key |
| Range or set of values | −30, −29, . . . , 49, 50 |
| Value embedding formula | PubKey B' = PubKey B + SHA256(value ⊕ S) × G |
| Key Communicating Method | Pay to Public Key Hash (P2PKH) |

2. Temp. Sensor A currently reads 21, and Temp. Sensor B reads 27
3. Temp. Sensor A detects a change from 21 to 20. Each Temp. Sensor embeds their reading into a Value Embedded PubKey (PubKey A' and PubKey B')
   a. Temp. Sensor A:
      i. PubKey A'=PubKey A+SHA256 (20 ⊕ S) × G
   b. Temp. Sensor B:
      i. PubKey B'=PubKey B+SHA256 (27 ⊕ S) × G
4. Both Temp. Sensors create and submit to the blockchain a Bitcoin transaction (Intermediate Transaction) with an output to their respective Value Embedded PubKey
   a. Temp. Sensor A's Intermediate Transaction: FIG. 36a
      Output 1—the input spending this output will communicate PubKey A' to the Controller
      Output 2—change back to Temp. Sensor A's public key A
   b. Temp. Sensor B's Intermediate Transaction: FIG. 36b
      Output 1—the input spending this output will communicate PubKey B' to the Controller
      Output 2—change back to Temp. Sensor B's public key B
5. Both Temp. Sensor create an unsigned Bitcoin transaction input which spends output 1 of their respective Intermediate Transaction. They send this input to the Controller. See FIG. 37 for
   a. Temp. Sensor A's transaction input
   b. Temp. Sensor B's transaction input
6. Controller uses the Bitcoin transaction inputs from the Temperature Sensors and creates a Bitcoin transaction representing an OR gate (OR Gate Transaction). This transaction includes an input from the Controller itself, so that it alone can modify the outputs. See FIG. 38

7. Controller requests for Temp. Sensor A and Temp. Sensor B to sign their respective input in the OR Gate Transaction using SIGHASH_NONE. This locks in the inputs, while still allowing the outputs to be modified. See FIG. 39
8. Controller uses its PubKey Protocol with Temp. Sensor A to calculate a Value Embedded PubKey for each temperature −30, −29, . . . , 49, 50 until it finds one which matches PubKey A'
    a. Controller finds that 20 produces the same Value Embedded PubKey as PubKey A'
9. Controller uses its PubKey Protocol with Temp. Sensor B to calculate a Value Embedded PubKey for each temperature −30, −29, . . . , 49, 50 until it finds one which matches PubKey B'
    a. Controller finds that 27 produces the same Value Embedded PubKey as PubKey B'
10. Controller applies the OR gate logic to the temperature readings:
    a. Temp. A>21 OR Temp. B>25
    b. 20>21 OR 27>25
    c. FALSE OR TRUE
    d. TRUE—send signal to S_COOL to expel cool air
11. Controller updates OR Gate Transaction's output to send signal to S_COOL and to give change back to itself. It then signs its input with SIGHASH_ALL to lock in all inputs and outputs, and submits to the blockchain. See FIG. 40
12. Airflow system upon seeing a transaction output to S_COOL, expels cool air Use Case Example 8: XNOR Logic Gate In this example we implement the Bitcoin transaction to represent an XNOR logic gate with two input sources. Consider a production system which produces two items: cricket balls and cricket ball corks. Both items pass through the same quality control which has two scanners A and B. Scanner A gives a belief reading from 0, 5, 10, . . . , 95, 100% of whether the ball is red. Scanner B gives a belief reading from 0, 5, 10, . . . , 95, 100% of whether the ball has stitches. If a ball has both features, it is accepted as it is a normal cricket ball. If a ball has neither feature, it is also accepted as it is a cork. If a ball has only one of the features, it is rejected because it is a defect. This is an implementation of a XNOR gate.

The whole system consists of 4 entities: Scanner A, Scanner B, Controller, and Production System. Both detectors send a belief to the controller when either one detects a change. XNOR Logic in Controller: Scanner Belief A>90% XNOR Scanner Belief B>60% Detecting stitches is less accurate than detecting red, so a larger range of acceptable values is used for Scanner B.

| Input Signal from Scanner A to Controller | Input Signal from Scanner B to Controller | Controller XNOR Logic | Output Signal from Controller to Prod. System |
|---|---|---|---|
| 0, 5, . . . , 75, 90% | 0, 5, . . . , 55, 60% | TRUE | Accept |
| 0, 5, . . . , 75, 90% | 65, 70, . . . , 95, 100% | FALSE | Reject |
| 95, 100% | 0, 5, . . . , 55, 60% | FALSE | Reject |
| 95, 100% | 65, 70, . . . , 95, 100% | TRUE | Accept |

All logic evaluation is performed by the Controller. The Scanners simply sends their belief reading but does not evaluate whether it is high enough to assume there is a fire.

Existing Setup
  Scanner A owns private/public key pair A which has 1BTC
  Scanner B owns private/public key pair B which has 1BTC
  Controller owns private/public key pair C which has 1BTC
  Production System owns private/public key pair S_ACCEPT and S_REJECT
Steps:
  1. When the system was first installed, Controller established a PubKey Protocol with Scanner A and Scanner B to allow secure communication of signals:
    a. Controller & Scanner A's PubKey Protocol parameters:

| Parameter | Details |
|---|---|
| Base public key | Public Key A (owned by Scanner A) |
| EC Generator G | secp256k1 |
| Shared Secret S | Private Key A) × (Private Key C) × G Controller & Scanner A calculates this by using each other's public key |
| Range or set of values | 0, 5, . . . , 95, 100% |
| Value embedding formula | PubKey A' = PubKey A + SHA256(value + S) × G |
| Key Communicating Method | Pay to Public Key Hash (P2PKH) | b. Controller & Scanner B's PubKey Protocol parameters:

| Parameter | Details |
|---|---|
| Base public key | Public Key B (owned by Scanner B) |
| EC Generator G | secp256k1 |
| Shared Secret S | (Private Key B) × (Private Key C) × G Controller & Scanner B calculates this by using each other's public key |
| Range or set of values | 0, 5, . . . , 95, 100% |
| Value embedding formula | PubKey B' = PubKey B + SHA256(value ○ S) × G |
| Key Communicating Method | Pay to Public Key Hash (P2PKH) |

2. A ball passes through the scanners. Scanner A reads 100% match. Scanner B reads 75% match.
  3. Each Scanner embeds their reading into a Value Embedded PubKey (PubKey A' and PubKey B')
    a. Scanner A:
      i. PubKey A'=PubKey A+SHA256(100% S)×G
    b. Scanner B:
      i. PubKey B'=PubKey B+SHA256(75% S)×G
  4. Both Scanners create and submit to the blockchain a Bitcoin transaction (Intermediate Transaction) with an output to their respective Value Embedded PubKey
    a. Scanner A's Intermediate Transaction: See FIG. 41*a*
      Output 1—the input spending this output will communicate PubKey A' to the Controller
      Output 2—change back to Scanner A's public key A
    b. Scanner B's Intermediate Transaction: See FIG. 41*b*
      Output 1—the input spending this output will communicate PubKey B' to the Controller
      Output 2—change back to Scanner B's public key B
  5. Both Scanners create an unsigned Bitcoin transaction input which spends output 1 of their respective Intermediate Transaction. They send this input to the Controller. See FIG. 42 for
    a. Scanner A's transaction input
    b. Scanner B's transaction input 6. Controller uses the Bitcoin transaction inputs from the Scanners and creates a Bitcoin transaction representing a XNOR gate (XNOR Gate Transaction). This transaction includes an input from the Controller itself, so that it alone can modify the outputs. See FIG. 43
7. Controller requests for Scanner A and Scanner B to sign their respective input in the XNOR Gate Transaction using SIGHASH_NONE. This locks in the inputs, while still allowing the outputs to be modified. See FIG. 44.
8. Controller uses its PubKey Protocol with Scanner A to calculate a Value Embedded PubKey for each belief 0, 5, . . . , 95, 100% until it finds one which matches PubKey A'
   a. Controller finds that 100% produces the same Value Embedded PubKey as PubKey A'
9. Controller uses its PubKey Protocol with Scanner B to calculate a Value Embedded PubKey for each belief 0, 5, . . . , 95, 100% until it finds one which matches PubKey B'
   a Controller finds that 75% produces the same Value Embedded PubKey as PubKey B'
10. Controller applies the NOR gate logic to the temperature readings:
    a. Scanner Belief A>90% XNOR Scanner Belief B>60%
    b. 100>60 XNOR 75>60
    c. TRUE OR TRUE
    d. TRUE—send signal to S_ACCEPT to accept the ball
11. Controller updates XNOR Gate Transaction's output to send signal to S_ACCEPT and to give change back to itself. It then signs its input with SIGHASH_ALL to lock in all inputs and outputs, and submits to the blockchain. See FIG. 45.
12. The system upon seeing a transaction output to S_ACCEPT, allows the ball to continue to packaging It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented control method implemented by a controller that is external to one or both of a transaction or a blockchain, the computer-implemented control method comprising:
   generating an intermediate transaction of the blockchain, wherein the intermediate transaction comprises:
      at least one signed output which comprises a value; and
   submitting the intermediate transaction to the blockchain;
   generating a final transaction of the blockchain, wherein the final transaction comprises:
      at least one signed input which references the value of the intermediate transaction; and
      at least one modifiable output;
   extracting the value from the signed input of the intermediate transaction;
   providing the value to a portion of logic to obtain a result, wherein the result is obtained by the controller applying the portion of logic to the value, and wherein the portion of logic represents a computer-implemented process;
   using the result to modify the at least one modifiable output of the final transaction such that the final transaction represents the result to produce at least one modified output, wherein the at least one modifiable output is modified by communicating with the final transaction; and
   recording the result by submitting the final transaction to the blockchain.

2. The computer-implemented control method according to claim 1, wherein the portion of logic is external to one or both of the final transaction and the blockchain.

3. The computer-implemented control method according to claim 1, wherein the portion of logic is arranged to implement a functionality of a logic gate.

4. The computer-implemented control method according to claim 3, wherein the logic gate is an AND, NOT, OR, NOR, XOR, IMPLY, NAND, NONIMPLY or XNOR gate.

5. The computer-implemented control method according to claim 1, wherein the signed input is provided to the final transaction using an unlocking script.

6. The computer-implemented control method according to claim 1, wherein at least one input is signed using a signature hash type which renders the input as non-modifiable.

7. The computer-implemented control method according to claim 6, wherein the signature hash type is SIGHASH_NONE.

8. The computer-implemented control method according to claim 1, wherein the final transaction further comprises at least one unsigned input.

9. The computer-implemented control method according to claim 8, further comprising a step of signing the unsigned input after the at least one modifiable output has been modified.

10. The computer-implemented control method according to claim 9, wherein the unsigned input is signed using a signature hash type which prevents modification of the final transaction.

11. The computer-implemented control method according to claim 10, wherein the signature hash type is SIGHASH_ALL.

12. The computer-implemented control method according to claim 1, wherein the value is:
    embedded in a public key associated with the signed input; and
    extracted from the public key so as to provide it to the portion of logic.

13. The computer-implemented control method according to claim 12, further comprising a step of establishing and/or selecting a protocol and using the protocol to embed the value in the public key.

14. The computer-implemented control method according to claim 12, wherein the public key is used to create a locking script in an intermediate transaction of the blockchain.

15. The computer-implemented control method according to 14, wherein the value is embedded in the public key by generating a new public key P', wherein:

$$P' = P + \text{HASH}(\text{value} \oplus S) \times G \quad (5)$$

where:
P is a base or initial public key
G is an Elliptic Curve function, such as secp256k1
× denotes elliptic curve multiplication by scalar; and
⊕ denotes elliptic curve addition.

16. The computer-implemented control method according to claim 15, further comprising the step of generating a new private key corresponding to the new public key P', wherein:
new private key V'=V+HASH (value+S).

17. The computer-implemented control method according to claim 12, wherein the value which is embedded in the public key is selected from a specified range of values.

18. A computer-implemented system comprising:
at least one computer-based resource that is external to one or both of a transaction or a blockchain, wherein the at least one computer-based resource comprises memory and one or more processors arranged to:
generate an intermediate transaction of the blockchain, wherein the intermediate transaction comprises:
at least one signed output which comprises a value; and
submitting the intermediate transaction to the blockchain;
generate a final transaction of the blockchain, wherein the final transaction comprises:
at least one signed input which references the value of the intermediate transaction; and
at least one modifiable output;
extract the value from the signed input;
provide the value to a portion of logic to obtain a result, wherein the result is obtained by the controller applying the portion of logic to the value, and wherein the portion of logic represents a computer-implemented process;
use the result to modify the at least one modifiable output of the final transaction such that the final transaction represents the result, wherein the at least one modifiable output is modified by communicating with the final transaction; and
record the result by submitting the final transaction to the blockchain.

* * * * *